US012058520B2

United States Patent
Kim et al.

(10) Patent No.: US 12,058,520 B2
(45) Date of Patent: Aug. 6, 2024

(54) PC5 LINK SECURITY SETUP USING NON-ACCESS STRATUM SECURITY CONTEXT

(71) Applicant: QUALCOMM Incorporated, San Diego, CA (US)

(72) Inventors: Hongil Kim, San Diego, CA (US); Soo Bum Lee, San Diego, CA (US); Adrian Edward Escott, Reading (GB); Anand Palanigounder, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 380 days.

(21) Appl. No.: 17/648,349

(22) Filed: Jan. 19, 2022

(65) Prior Publication Data
US 2022/0272532 A1 Aug. 25, 2022

Related U.S. Application Data

(60) Provisional application No. 63/152,229, filed on Feb. 22, 2021.

(51) Int. Cl.
*H04W 12/06* (2021.01)
*H04W 12/041* (2021.01)
(Continued)

(52) U.S. Cl.
CPC ......... *H04W 12/06* (2013.01); *H04W 12/041* (2021.01); *H04W 60/00* (2013.01); *H04W 76/11* (2018.02); *H04W 88/04* (2013.01)

(58) Field of Classification Search
CPC ... H04W 12/041; H04W 12/06; H04W 60/00; H04W 76/11; H04W 88/04; H04W 92/18
See application file for complete search history.

(56) References Cited

U.S. PATENT DOCUMENTS

| 10,728,758 B2 * | 7/2020 | Agiwal ................. H04W 76/10 |
| 2016/0057622 A1 * | 2/2016 | Koshimizu ........... H04W 12/06 |
| | | 713/168 |

(Continued)

OTHER PUBLICATIONS

3GPP TR 33.847: "3rd Generation Partnership Project; Technical Specification Group Services and System Aspects; Study on Security Aspects of Enhancement for Proximity Based Services in the SG System (5GS) (Release17)", 3GPP Standard, Technical Report, 3GPP TR 33.847 V0.4.0 (Jan. 2021), 3rd Generation Partnership Project (3GPP), Mobile Competence Centre, 650, Route Des Lucioles, F-06921 Sophia-Antipolis Cedex, France, vol. SA WG3, No. V0.4.0, Feb. 8, 2021 (Feb. 8, 2021), pp. 1-106, XP051999407, Retrieved from the Internet: URL: https://ftp.3gpp.org/Specs/archive/33_series/33.847/33847-040.zip 33847-040.docx [retrieved on Feb. 8, 2021] figures 6.10.2.1-1, 6.10.2.2-1, 6.18.2-1, 6.20.2-1 Section 6.10; p. 47-p. 51 Section 6.18; p. 65-p. 68, Section 6.20, p. 69-p. 71.
(Continued)

*Primary Examiner* — Siu M Lee
(74) *Attorney, Agent, or Firm* — Harrity & Harrity, LLP

(57) ABSTRACT

Various aspects of the present disclosure generally relate to wireless communication. In some aspects, a user equipment (UE) may transmit, to a relay UE, a first message comprising a first freshness parameter, an identity of the UE, and authentication information, where the authentication information is used by a network node to authenticate the UE with security context information of the UE. The UE may derive a relay key for security establishment between the UE and the relay UE based on the first freshness parameter, a set of key generation parameters, and a shared key with the network node. The UE may derive a relay session key for security establishment between the UE and the relay UE based on the relay key, a first nonce of the UE, and a second nonce of the relay UE. Numerous other aspects are described.

30 Claims, 11 Drawing Sheets

(51) Int. Cl.
*H04W 60/00* (2009.01)
*H04W 76/11* (2018.01)
*H04W 88/04* (2009.01)

(56) References Cited

U.S. PATENT DOCUMENTS

2021/0345104 A1* 11/2021 Cheng ............... H04W 12/0433
2023/0319549 A1* 10/2023 Dees .................... H04W 12/06
                                                                 455/410
2023/0388785 A1* 11/2023 Ferdi .................. H04W 12/041

OTHER PUBLICATIONS

3GPP TS 33.503: "3rd Generation Partnership Project; Technical Specification Group Services and System Aspects; Security Aspects of Proximity Based Services (ProSe) in the 5G System (5GS) (Release 17)", 3GPP Draft, S3-214511 V0.2.0 (Nov. 2021), 3rd Generation Partnership Project (3GPP), Mobile Competence Centre, 650, Route Des Lucioles, F-06921 Sophia-Antipolis Cedex, France, Nov. 26, 2021 (Nov. 26, 2021), XP052081781, pp. 1-31, Retrieved from the Internet: URL: https://ftp.3gpp.org/tsg_sa/WG3_Security/TSGS3_105e/Docs/S3-214511.zip S3-214511 Draft TS 33.503 v0.2.0-cl.docx [retrieved on Nov. 26, 2021] figures 6.3.3.2.2-1, 6.3.3.3.2-1 Section 6.3; p. 21-p. 28 Annex https://ftp.3gpp.org/tsg_sa/WG3_Security/TSGS3_105e/Docs/S3-214511.zip.

Interdigital: "TR 33.847—Cumulative Changes", 3GPP Draft, S3-213303, 3GPP TSG-SA3 Meeting #104-e ad-hoc, 3rd Generation Partnership Project (3GPP), Mobile Competence Centre, 650, Route Des Lucioles, F-06921 Sophia-Antipolis Cedex, France, vol. SA WG3, No. e-meeting, Sep. 27, 2021-Sep. 30, 2021, Sep. 17, 2021 (Sep. 17, 2021), XP052060137, 123 Pages, Retrieved from the Internet: URL:https://ftp.3gpp.org/tsg_sa/WG3_Security/TSGS3_104-e_ad_hoc/Docs/S3-213303.zip S3-213303—TR 33.847—cumulative changes.docx [retrieved on Sep. 17, 2021] figures 6.1.2-1, 6.10.2.1-1, 6.10.2.2-1, 6.33.2-1 figures 6.41.1-1, 6.41.2.3-1 Section 6.1, p. 16-p. 19 Section 6.10, p. 37-p. 44 Section 6.33, p. 105-p. 106 Section 6. 41, p. 118-p. 120.

Interdigital: "TR 33.847 Update for Solution #10", 3GPP Draft, S3-212129, 3GPP TSG-SA3 Meeting #103-e, 3rd Generation Partnership Project (3GPP), Mobile Competence Centre, 650, Route Des Lucioles, F-06921 Sophia-Antipolis Cedex, France, vol. SA WG3, No. e-meeting, May 17, 2021-May 28, 2021, May 21, 2021 (May 21, 2021), XP052013380, 9 Pages, Retrieved from the Internet: URL: https://ftp.3gpp.org/tsg_sa/WG3_Security/TSGS3_103e/Docs/S3-212129.zip S3-212129.docx [retrieved on May 21, 2021] the whole document.

Interdigital: "TR 33.847 Update for Solution #10", 3GPP Draft, S3-213059, 3GPP TSG-SA3 Meeting #104-e, 3rd Generation Partnership Project (3GPP), Mobile Competence Centre, 650, Route Des Lucioles, F-06921 Sophia-Antipolis Cedex, France, vol. SA WG3, No. e-meeting, Aug. 16, 2021-Aug. 27, 2021, Aug. 20, 2021 (Aug. 20, 2021), XP052063709, 8 Pages, Retrieved from the Internet: URL:https://ftp.3gpp.org/tsg_sa/WG3_Security/TSGS3_104e/Docs/S3-213059.zip S3-213059.docx [retrieved on Aug. 20, 2021] the whole document.

International Search Report and Written Opinion—PCT/US2022/070260—ISA/EPO—Apr. 7, 2022.

Samsung, et al., "Proposal for U2NW Relay Authentication, Authorization and Key Management", 3GPP Draft, S3-214495, 3GPP TSG-SA3 Meeting #105-e, 3rd Generation Partnership Project (3GPP), Mobile Competence Centre, 650, Route Des Lucioles, F-06921 Sophia-Antipolis Cedex, France, vol. SA WG3, No. e-meeting, Nov. 8, 2021-Nov. 19, 2021, Nov. 22, 2021 (Nov. 22, 2021), XP052082567, 6 Pages, Retrieved from the Internet: URL:https://ftp.3gpp.org/tsg_sa/WG3_Security/TSGS3_105e/Docs/S3-214495.zip S3-214495.doc [retrieved on Nov. 22, 2021] the whole document.

Samsung: "pCR for Resolving ENs in Solution#1", 3GPP Draft, S3-211130, 3GPP TSG-SA3 Meeting #102bis-e, 3rd Generation Partnership Project (3GPP), Mobile Competence Centre, 650, Route Des Lucioles, F-06921 Sophia-Antipolis Cedex, France, vol. SA WG3, No. e-meeting, Mar. 1, 2021-Mar. 5, 2021, Feb. 22, 2021 (Feb. 22, 2021), XP051980518, 3 Pages, Retrieved from the Internet: URL:https://ftp.3gpp.org/tsg_sa/WG3_Security/SGS3_102Bis-e/Docs/S3-211130.zip S3-211130-[ProSe] Resolving ENs in Sol#1.doc [retrieved on Feb. 22, 2021] the whole document.

* cited by examiner

PC5 LINK SECURITY SETUP USING NON-ACCESS STRATUM SECURITY CONTEXT

CROSS-REFERENCE TO RELATED APPLICATION

This Patent Application claims priority to U.S. Provisional Patent Application No. 63/152,229, filed on Feb. 22, 2021, entitled "PC5 LINK SECURITY SETUP USING NON-ACCESS STRATUM SECURITY CONTEXT," and assigned to the assignee hereof. The disclosure of the prior Application is considered part of and is incorporated by reference into this Patent Application.

FIELD OF THE DISCLOSURE

Aspects of the present disclosure generally relate to wireless communication and to techniques and apparatuses for setting up PC5 link security using a non-access stratum security context.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A UE may communicate with a BS via the downlink and uplink. "Downlink" (or "forward link") refers to the communication link from the BS to the UE, and "uplink" (or "reverse link") refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Figure 1:
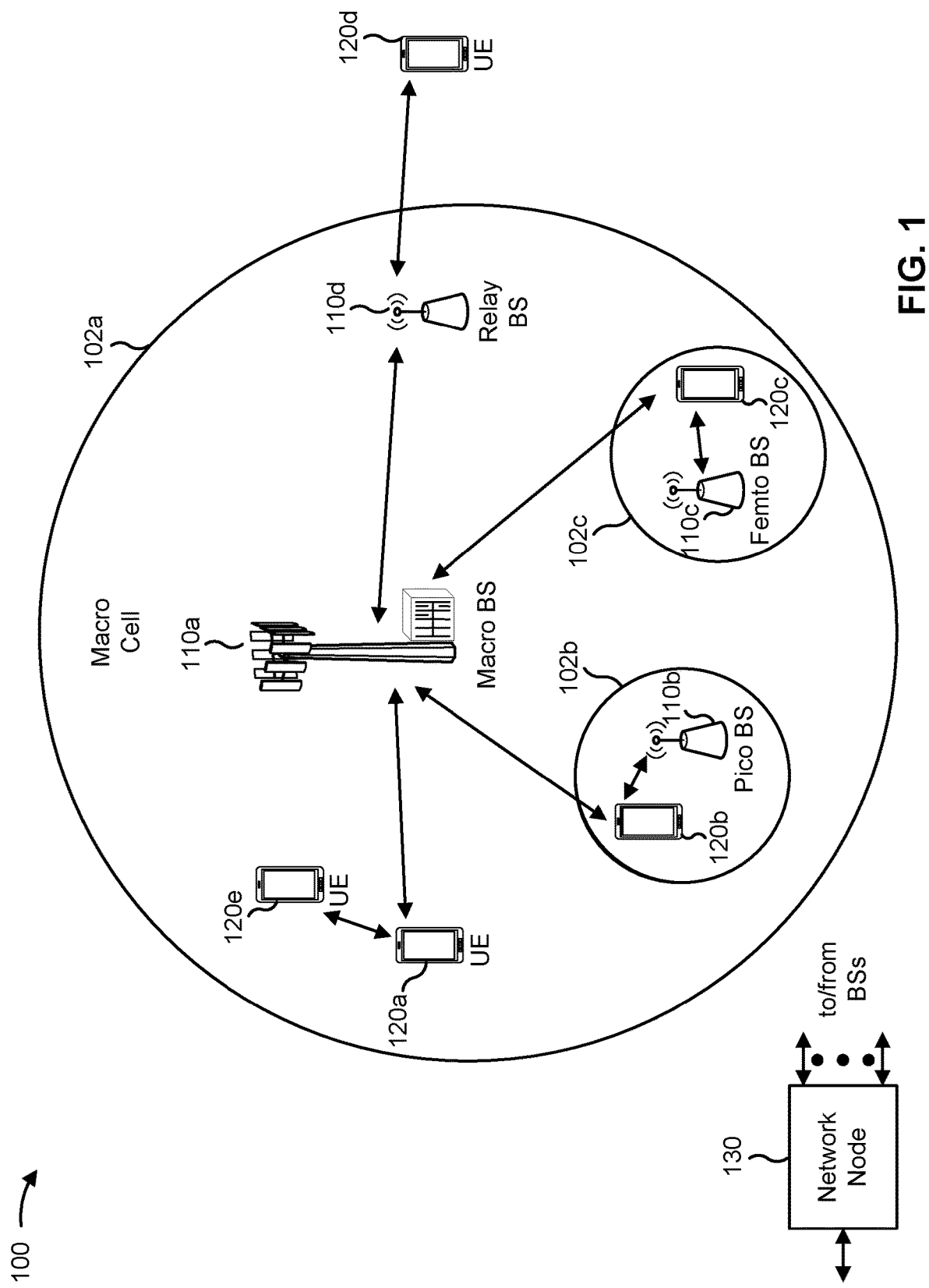
FIG. 1 is a diagram illustrating an example of a wireless network, in accordance with the present disclosure.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

In some aspects, a method of wireless communication performed by a user equipment (UE) (e.g., a remote UE) includes transmitting, to a relay UE, a first message comprising a first nonce, a first freshness parameter, an identity of the UE, and authentication information. The authentication information may be used by a network node to authenticate the UE with security context information of the UE that was established during registration of the UE with the network node. The method may include receiving, from the relay UE, a second message comprising a second nonce and a set of key generation parameters and deriving a relay key for security establishment between the UE and the relay UE based at least in part on the first freshness parameter, the set of key generation parameters, and a shared key with the network node. The method may also include deriving a relay session key for security establishment between the UE and the relay UE based at least in part on the relay key, the first nonce, and the second nonce. The method may include verifying the second message based at least in part on the relay session key and transmitting a third message, to the relay UE, that is protected based at least in part on the relay session key.

In some aspects, a method of wireless communication performed by a network node includes receiving, from a remote UE via a relay UE, a first freshness parameter, an identity of the remote UE, and authentication information. The authentication information may be used by the network node to authenticate the remote UE based at least in part on security context information of the remote UE, and the security context information may be identified by the identity of the remote UE. The method may include verifying the authentication information based at least in part on the security context information of the remote UE and a shared key with the remote UE and deriving a relay key for security establishment between the remote UE and the relay UE based at least in part on the first freshness parameter and the shared key with the remote UE. The method may also include transmitting an identity of the relay key to the remote UE via the relay UE.

In some aspects, a UE for wireless communication includes a memory and one or more processors, coupled to the memory, configured to transmit, to a relay UE, a first message comprising a first nonce, a first freshness parameter, an identity of the UE, and authentication information. The authentication information may be used by a network node to authenticate the UE with security context information of the UE that was established during registration of the UE with the network node. The one or more processors may be configured to receive, from the relay UE, a second message comprising a second nonce and a set of key generation parameters and derive a relay key for security establishment between the UE and the relay UE based at least in part on the first freshness parameter, the set of key generation parameters, and a shared key with the network node. The one or more processors may be configured to derive a relay session key for security establishment between the UE and the relay UE based at least in part on the relay key, the first nonce, and the second nonce. The one or more processors may be configured to verify the second message based at least in part on the relay session key and transmit a third message, to the relay UE, that is protected based at least in part on the relay session key.

In some aspects, a network node for wireless communication includes a memory and one or more processors, coupled to the memory, configured to receive, from a remote UE via a relay UE, a first freshness parameter, an identity of the remote UE, and authentication information. The authentication information may be used by the network node to authenticate the remote UE based at least in part on security context information of the remote UE, and the security context information may be identified by the identity of the remote UE. The one or more processors may be configured to verify the authentication information based at least in part on the security context information of the remote UE and a shared key with the remote UE and derive a relay key for security establishment between the remote UE and the relay UE based at least in part on the first freshness parameter and the shared key with the remote UE. The one or more processors may be configured to transmit an identity of the relay key to the remote UE via the relay UE and receive a message, from the remote UE via the relay UE, that is protected based at least in part on the relay key.

In some aspects, a non-transitory computer-readable medium storing a set of instructions for wireless communication includes one or more instructions that, when executed by one or more processors of a UE, cause the UE to: transmit, to a relay UE, a first message comprising a first nonce, a first freshness parameter, an identity of the UE, and authentication information, where the authentication information is used by a network node to authenticate the UE with security context information of the UE that was established during registration of the UE with the network node; receive, from the relay UE, a second message comprising a second nonce and a set of key generation parameters; derive a relay key for security establishment between the UE and the relay UE based at least in part on the first freshness parameter, the set of key generation parameters, and a shared key with the network node; derive a relay session key for security establishment between the UE and the relay UE based at least in part on the relay key, the first nonce, and the second nonce; verify the second message based at least in part on the relay session key; and transmit a third message, to the relay UE, that is protected based at least in part on the relay session key.

In some aspects, a non-transitory computer-readable medium storing a set of instructions for wireless communication includes one or more instructions that, when executed by one or more processors of a network node, cause the network node to receive, from a remote UE via a relay UE, a first freshness parameter, an identity of the remote UE, and authentication information, where the authentication information is used by the network node to authenticate the remote UE based at least in part on security context information of the remote UE, and where the security context information is identified by the identity of the remote UE; verify the authentication information based at least in part on the security context information of the remote UE and a shared key with the remote UE; derive a relay key for security establishment between the remote UE and the relay UE based at least in part on the first freshness parameter and the shared key with the remote UE; transmit an identity of the relay key to the remote UE via the relay UE.

In some aspects, an apparatus for wireless communication includes means for transmitting, to a relay UE, a first message comprising a first nonce, a first freshness parameter, an identity of the apparatus, and authentication information, where the authentication information is used by a network node to authenticate the apparatus with security context information of the apparatus that was established during registration of the apparatus with the network node. The apparatus may include means for receiving, from the relay UE, a second message comprising a second nonce and a set of key generation parameters and means for deriving a relay key for security establishment between the apparatus and the relay UE based at least in part on the first freshness parameter, the set of key generation parameters, and a shared key with the network node. The apparatus may include means for deriving a relay session key for security establishment between the apparatus and the relay UE based at least in part on the relay key, the first nonce, and the second nonce, means for verifying the second message based at least in part on the relay session key, and means for transmitting a third message, to the relay UE, that is protected based at least in part on the relay session key.

In some aspects, an apparatus for wireless communication includes means for receiving, from a remote UE via a relay UE, a first freshness parameter, an identity of the remote UE, and authentication information, where the authentication information is used by the apparatus to authenticate the remote UE based at least in part on security context information of the remote UE, and where the security context information is identified by the identity of the remote UE. The apparatus may include means for verifying the authentication information based at least in part on the security context information of the remote UE and a shared key with the remote UE, means for deriving a relay key for security establishment between the remote UE and the apparatus based at least in part on the first freshness parameter and the shared key with the remote UE, means for transmitting an identity of the relay key to the remote UE via the relay UE, and means for receiving a message, from the remote UE via the relay UE, that is protected based at least in part on the relay key.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects are described in the present disclosure by reference to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, or artificial intelligence-enabled devices). Aspects may be implemented in chip-level components, modular components, non-modular components, non-chip-level components, device-level components, or system-level components. Devices incorporating described aspects and features may include additional components and features for implementation and practice of claimed and described aspects. For example, transmission and reception of wireless signals may include a number of components for analog and digital purposes (e.g., hardware components including antennas, radio frequency (RF) chains, power amplifiers, modulators, buffers, processors, interleavers, adders, or summers). It is intended that aspects described herein may be practiced in a wide variety of devices, components, systems, distributed arrangements, or end-user devices of varying size, shape, and constitution.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

FIG. 1 is a diagram illustrating an example of a wireless network 100, in accordance with the present disclosure. The wireless network 100 may be or may include elements of a 5G (NR) network and/or an LTE network, among other examples. The wireless network 100 may include a number of base stations 110 (shown as BS 110a, BS 110b, BS 110c, and BS 110d) and other network entities. A base station (BS) is an entity that communicates with UEs and may also be referred to as an NR BS, a Node B, a gNB, a 5G node B (NB), an access point, a transmit receive point (TRP), or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110*d* may communicate with macro BS 110*a* and a UE 120*d* in order to facilitate communication between BS 110*a* and UE 120*d*. A relay BS may also be referred to as a relay station, a relay base station, a relay, or the like.

Wireless network 100 may be a heterogeneous network that includes BSs of different types, such as macro BSs, pico BSs, femto BSs, relay BSs, or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network node 130 may couple to a set of BSs and may provide coordination and control for these BSs. Network node 130 may communicate with the BSs via a backhaul. The BSs may also communicate with one another directly or indirectly, via a wireless or wireline backhaul.

UEs 120 (e.g., 120*a*, 120*b*, 120*c*) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120*a* and UE 120*e*) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol or a vehicle-to-infrastructure (V2I) protocol), and/or a mesh network. In this case, UE 120 may perform scheduling operations, resource selection operations, and/or other operations described elsewhere herein as being performed by base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
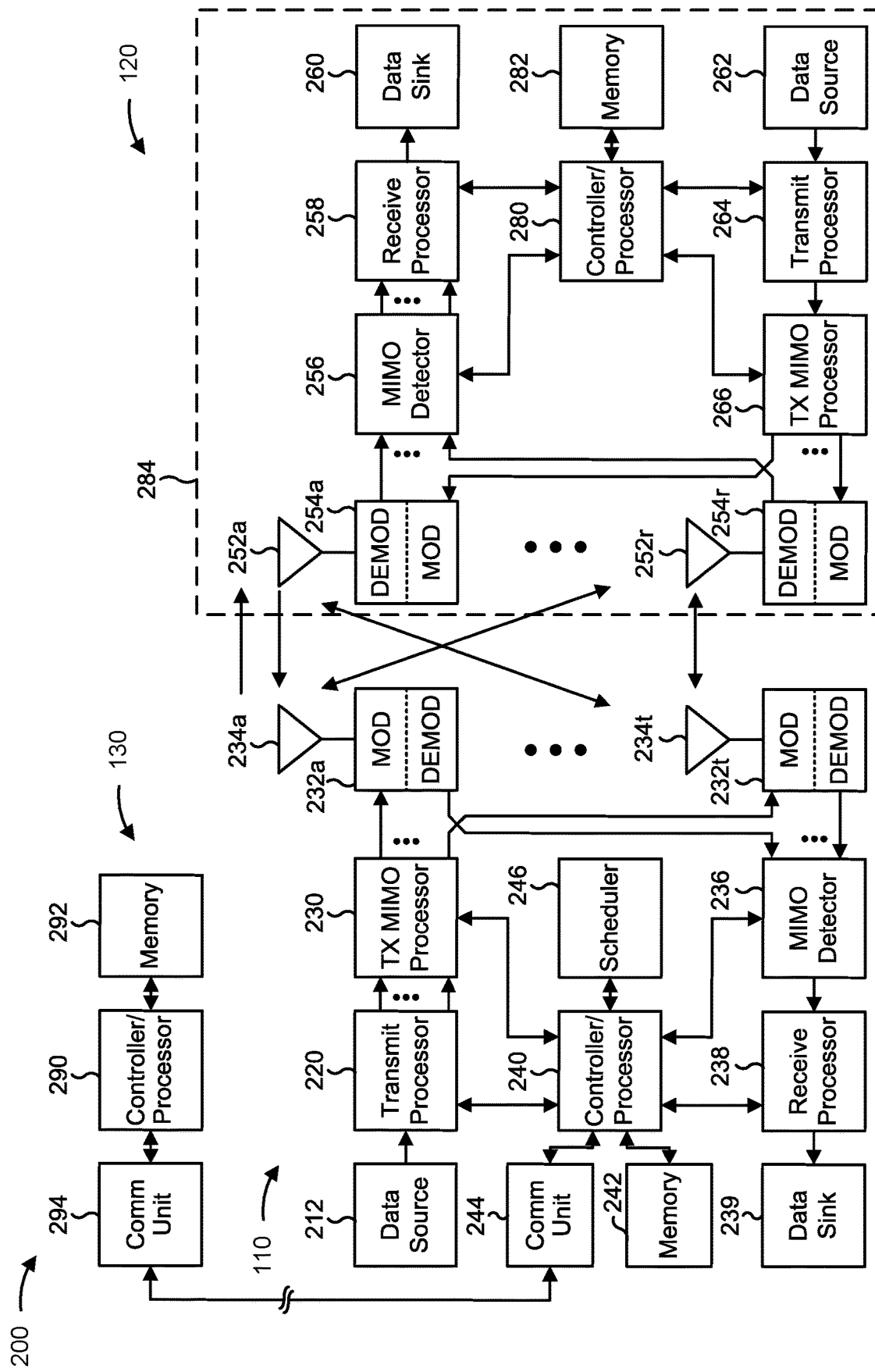
FIG. 2 is a diagram illustrating an example of a base station in communication with a UE in a wireless network, in accordance with the present disclosure.

FIG. 2 is a diagram illustrating an example 200 of a base station 110 in communication with a UE 120 in a wireless network 100, in accordance with the present disclosure. Base station 110 may be equipped with T antennas 234*a* through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a channel quality indicator (CQI) parameter, among other examples. In some aspects, one or more components of UE 120 may be included in a housing 284.

Network node 130 may include communication unit 294, controller/processor 290, and memory 292. Network node 130 may include, for example, one or more devices in a core network, such as an AMF. Network node 130 may communicate with base station 110 via communication unit 294.

One or more antennas (e.g., antennas 234a through 234t and/or antennas 252a through 252r) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM or CP-OFDM) and transmitted to base station 110. In some aspects, a modulator and a demodulator (e.g., MOD/DEMOD 254) of UE 120 may be included in a modem of UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein (for example, with reference to FIGS. 5-11).

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network node 130 via communication unit 244. Base station 110 may include a scheduler 246 to schedule UEs 120 for downlink and/or uplink communications. In some aspects, a modulator and a demodulator (e.g., MOD/DEMOD 232) of base station 110 may be included in a modem of the base station 110. In some aspects, base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein (for example, with reference to FIGS. 5-11).

Controller/processor 240 of base station 110, controller/processor 280 of UE 120, and/or any other component(s) of FIG. 2 may perform one or more techniques associated with setting up PC5 link security using a non-access stratum (NAS) security context, as described in more detail elsewhere herein. For example, controller/processor 240 of base station 110, controller/processor 280 of UE 120, controller/processor 290 of network node 130, and/or any other component(s) of FIG. 2 may perform or direct operations of, for example, process 800 of FIG. 8, process 900 of FIG. 9, and/or other processes as described herein. Memories 242, 282, and 292 may store data and program codes for base station 110, UE 120, and network node 130, respectively. In some aspects, memory 242 memory 282, and/or memory 292 may include a non-transitory computer-readable medium storing one or more instructions (e.g., code and/or program code) for wireless communication. For example, the one or more instructions, when executed (e.g., directly, or after compiling, converting, and/or interpreting) by one or more processors of base station 110, UE 120, and/or the network node 130, may cause the one or more processors, UE 120, network node 130, and/or the base station 110 to perform or direct operations of, for example, process 800 of FIG. 8, process 900 of FIG. 9, and/or other processes as described herein. In some aspects, executing instructions may include running the instructions, converting the instructions, compiling the instructions, and/or interpreting the instructions, among other examples.

In some aspects, UE 120 includes means for transmitting, to a relay UE, a first message comprising a first nonce, a first freshness parameter, an identity of the UE, and authentication information, where the authentication information is used by a network node to authenticate the UE with security context information of the UE that was established during registration of the UE with the network node; means for receiving, from the relay UE, a second message comprising a second nonce and a set of key generation parameters; means for deriving a relay key for security establishment between the UE and the relay UE based at least in part on the first freshness parameter, the set of key generation parameters, and a shared key with the network node; means for deriving a relay session key for security establishment between the UE and the relay UE based at least in part on the relay key, the first nonce, and the second nonce; means for verifying the second message based at least in part on the relay session key; and/or means for transmitting a third message, to the relay UE, that is protected based at least in part on the relay session key. The means for UE 120 to perform operations described herein may include, for example, one or more of antenna 252, demodulator 254, MIMO detector 256, receive processor 258, transmit processor 264, TX MIMO processor 266, modulator 254, controller/processor 280, or memory 282.

In some aspects, a network node includes means for receiving, from a remote UE via a relay UE, a first freshness parameter, an identity of the remote UE, and authentication information, where the authentication information is used by the network node to authenticate the remote UE based at least in part on security context information of the remote UE, and where the security context information is identified by the identity of the remote UE; means for verifying the authentication information based at least in part on the security context information of the remote UE and a shared key with the remote UE; means for deriving a relay key for security establishment between the remote UE and the relay UE based at least in part on the first freshness parameter and the shared key with the remote UE; means for transmitting an identity of the relay key to the remote UE via the relay UE; and/or means for receiving a message, from the remote UE via the relay UE, that is protected based at least in part on the relay key. In some aspects, the means for the network node to perform operations described herein may include, for example, one or more of controller/processor 290, memory 292, or communication unit 294.

In some aspects, the network node includes means for transmitting a second freshness parameter based at least in part on whether the first freshness parameter is an uplink NAS count. In some aspects, the network node includes means for transmitting the relay key to the relay UE.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided as an example. Other examples may differ from what is described with regard to FIG. 2.

Figure 3:
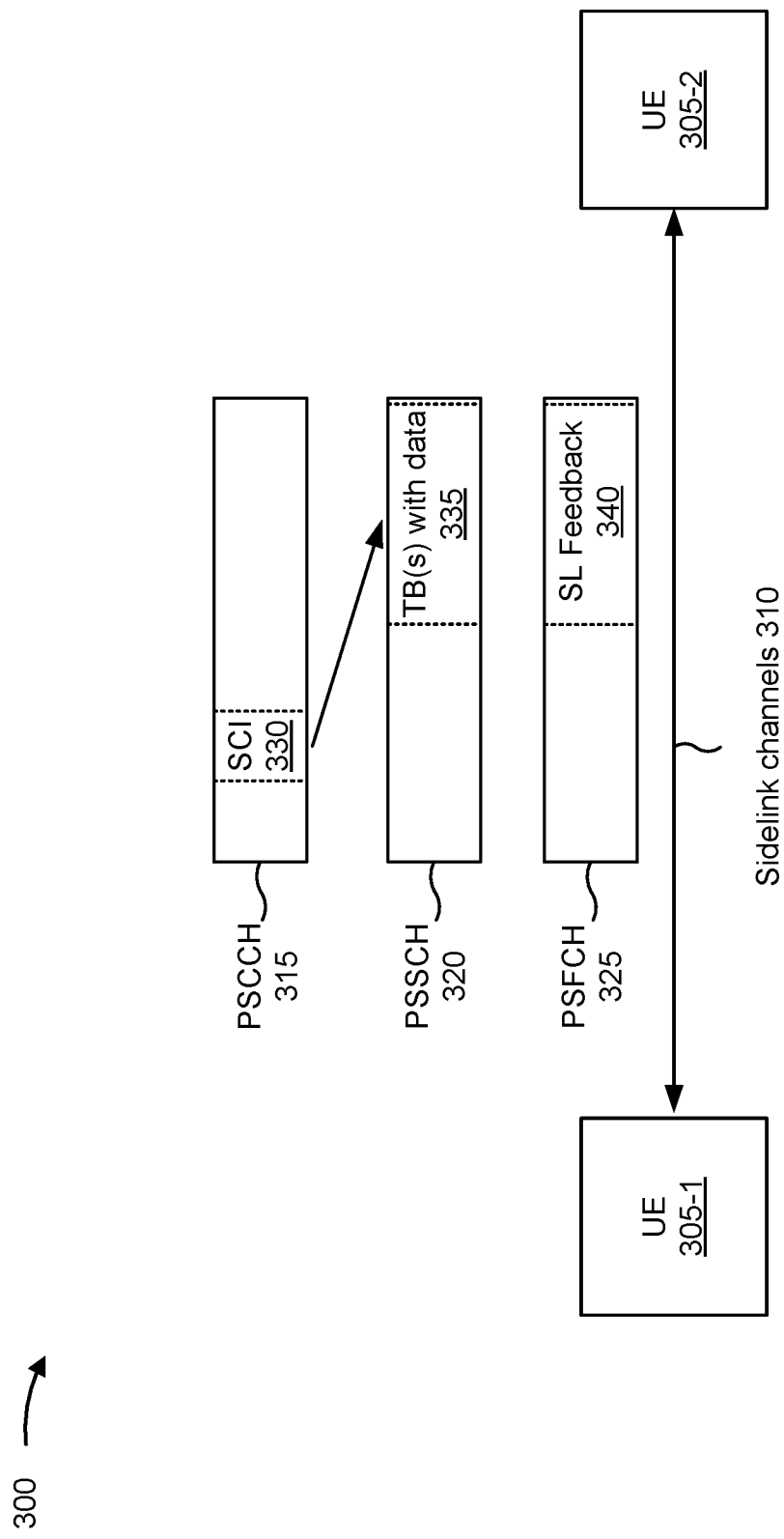
FIG. 3 is a diagram illustrating an example of sidelink communications, in accordance with the present disclosure.

FIG. 3 is a diagram illustrating an example 300 of sidelink communications, in accordance with the present disclosure.

As shown in FIG. 3, a first UE 305-1 may communicate with a second UE 305-2 (and one or more other UEs 305) via one or more sidelink channels 310. UEs 305-1 and 305-2 may communicate using the one or more sidelink channels 310 for P2P communications, D2D communications, V2X communications (e.g., which may include V2V communications, V2I communications, V2P communications), and/or mesh networking. In some aspects, UEs 305 (e.g., UE 305-1 and/or UE 305-2) may correspond to one or more other UEs described elsewhere herein, such as UE 120. In some aspects, one or more sidelink channels 310 may use a PC5 interface and/or may operate in a high frequency band (e.g., the 5.9 GHz band). Additionally, or alternatively, the UEs 305 may synchronize timing of transmission time intervals (e.g., frames, subframes, slots, symbols, and/or the like) using global navigation satellite system timing.

As further shown in FIG. 3, one or more sidelink channels 310 may include a physical sidelink control channel (PSCCH) 315, a physical sidelink shared channel (PSSCH) 320, and/or a physical sidelink feedback channel (PSFCH) 325. PSCCH 315 may be used to communicate control information, similar to a physical downlink control channel (PDCCH) and/or a physical uplink control channel (PUCCH) used for cellular communications with a base station 110 via an access link or an access channel. PSSCH 320 may be used to communicate data, similar to a physical downlink shared channel (PDSCH) and/or a physical uplink shared channel (PUSCH) used for cellular communications with base station 110 via an access link or an access channel. For example, PSCCH 315 may carry sidelink control information (SCI) 330, which may indicate various control information used for sidelink communications, such as one or more resources (e.g., time resources, frequency resources, spatial resources) where a transport block (TB) 335 may be carried on PSSCH 320. TB 335 may include data. PSFCH 325 may be used to communicate sidelink feedback 340, such as hybrid automatic repeat request (HARD) feedback (e.g., acknowledgement or negative acknowledgement (ACK/NACK) information), transmit power control, a scheduling request, and/or the like.

In some aspects, one or more sidelink channels 310 may use resource pools. For example, a scheduling assignment (e.g., included in SCI 330) may be transmitted in sub-channels using specific resource blocks (RBs) across time. In some aspects, data transmissions (e.g., on PSSCH 320) associated with a scheduling assignment may occupy adjacent RBs in the same subframe as the scheduling assignment (e.g., using frequency division multiplexing). In some aspects, a scheduling assignment and associated data transmissions are not transmitted on adjacent RBs.

In some aspects, a UE 305 may operate using a transmission mode where resource selection and/or scheduling is performed by UE 305 (e.g., rather than a base station 110). In some aspects, UE 305 may perform resource selection and/or scheduling by sensing channel availability for transmissions. For example, UE 305 may measure an RSSI parameter (e.g., a sidelink-RSSI (S-RSSI) parameter) associated with various sidelink channels, may measure an RSRP parameter (e.g., a PSSCH-RSRP parameter) associated with various sidelink channels, may measure an RSRQ parameter (e.g., a PSSCH-RSRQ parameter) associated with various sidelink channels and may select a channel for transmission of a sidelink communication based at least in part on the measurement(s).

Additionally, or alternatively, UE 305 may perform resource selection and/or scheduling using SCI 330 received in PSCCH 315, which may indicate occupied resources, and/or channel parameters. Additionally, or alternatively, UE 305 may perform resource selection and/or scheduling by determining a channel busy rate associated with various sidelink channels, which may be used for rate control (e.g., by indicating a maximum number of resource blocks that UE 305 can use for a particular set of subframes).

In the transmission mode where resource selection and/or scheduling is performed by a UE 305, UE 305 may generate sidelink grants, and may transmit the grants in SCI 330. A sidelink grant may indicate, for example, one or more parameters (e.g., transmission parameters) to be used for an upcoming sidelink transmission, such as one or more resource blocks to be used for the upcoming sidelink transmission on PSSCH 320 (e.g., for TBs 335), one or more subframes to be used for the upcoming sidelink transmission, and/or a modulation and coding scheme to be used for the upcoming sidelink transmission. In some aspects, a UE 305 may generate a sidelink grant that indicates one or more parameters for semi-persistent scheduling, such as a periodicity of a sidelink transmission. Additionally, or alternatively, the UE 305 may generate a sidelink grant for event-driven scheduling, such as for an on-demand sidelink message.

As indicated above, FIG. 3 is provided as an example. Other examples may differ from what is described with respect to FIG. 3.

Figure 4:
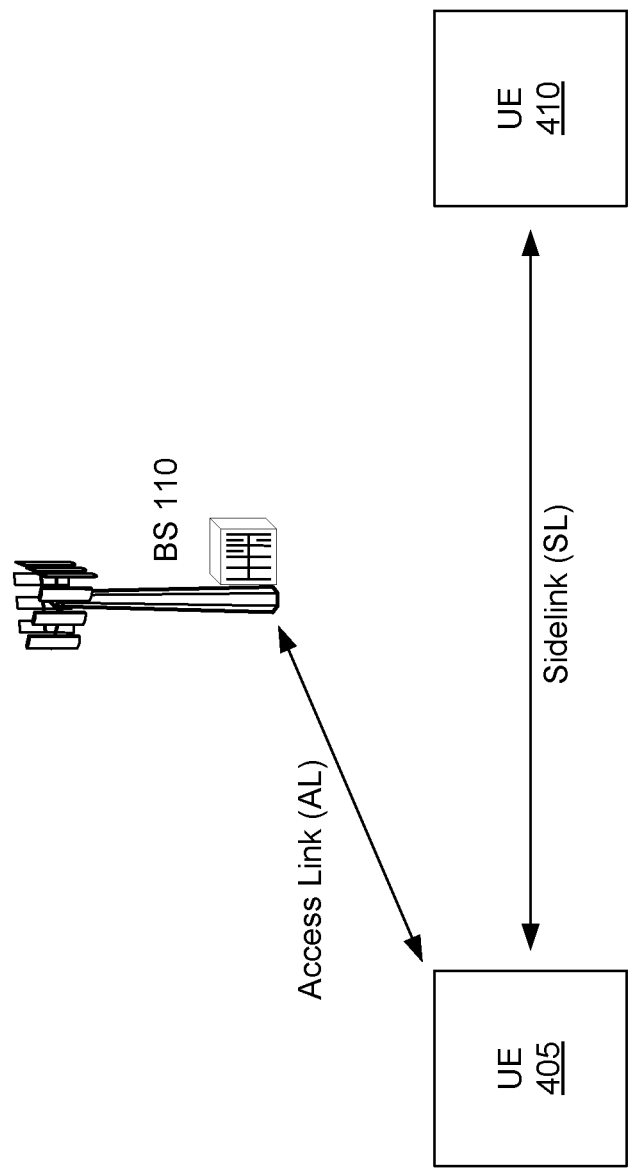
FIG. 4 is a diagram illustrating an example of sidelink communications and access link communications, in accordance with the present disclosure.

FIG. 4 is a diagram illustrating an example 400 of sidelink communications and access link communications, in accordance with the present disclosure.

As shown in FIG. 4, a UE 405 and another UE 410 may communicate with one another via a sidelink, as described above in connection with FIG. 3. As further shown, in some sidelink modes, a base station 110 may communicate with UE 405 via a first access link. Additionally, or alternatively, in some sidelink modes, base station 110 may communicate with UE 410 via a second access link. UE 405 and/or UE 410 may correspond to one or more UEs described elsewhere herein, such as UE 120 of FIG. 1. Thus, a direct link between UEs 120 (e.g., via a PC5 interface) may be referred to as a sidelink, and a direct link between a base station 110 and a UE 120 (e.g., via a Uu interface) may be referred to as an access link. Sidelink communications may be transmitted on a PC5 via the sidelink, and access link communications may be transmitted via the access link. An access link communication may be either a downlink communication (from a base station 110 to a UE 120) or an uplink communication (from a UE 120 to a base station 110) on a Uu interface.

Communication between 405 and 410, with base station 110 allocating resources for sidelink transmissions, may be referred to as Mode 1 sidelink communication. In Mode 1, UE 405 may be a relay UE for UE 410 (remote UE). In sidelink Mode 1, base station 110 may schedule a sidelink resource upon receiving a sidelink buffer status report (SL-BSR) from UE 405. Base station 110 may then transmit a sidelink grant via downlink control information (DCI) to UE 405. Communication between UE 405 and UE 410, without involving BS 110, may be referred to as Mode 2 sidelink communication.

As indicated above, FIG. 4 is provided as an example. Other examples may differ from what is described with respect to FIG. 4.

Figure 5:
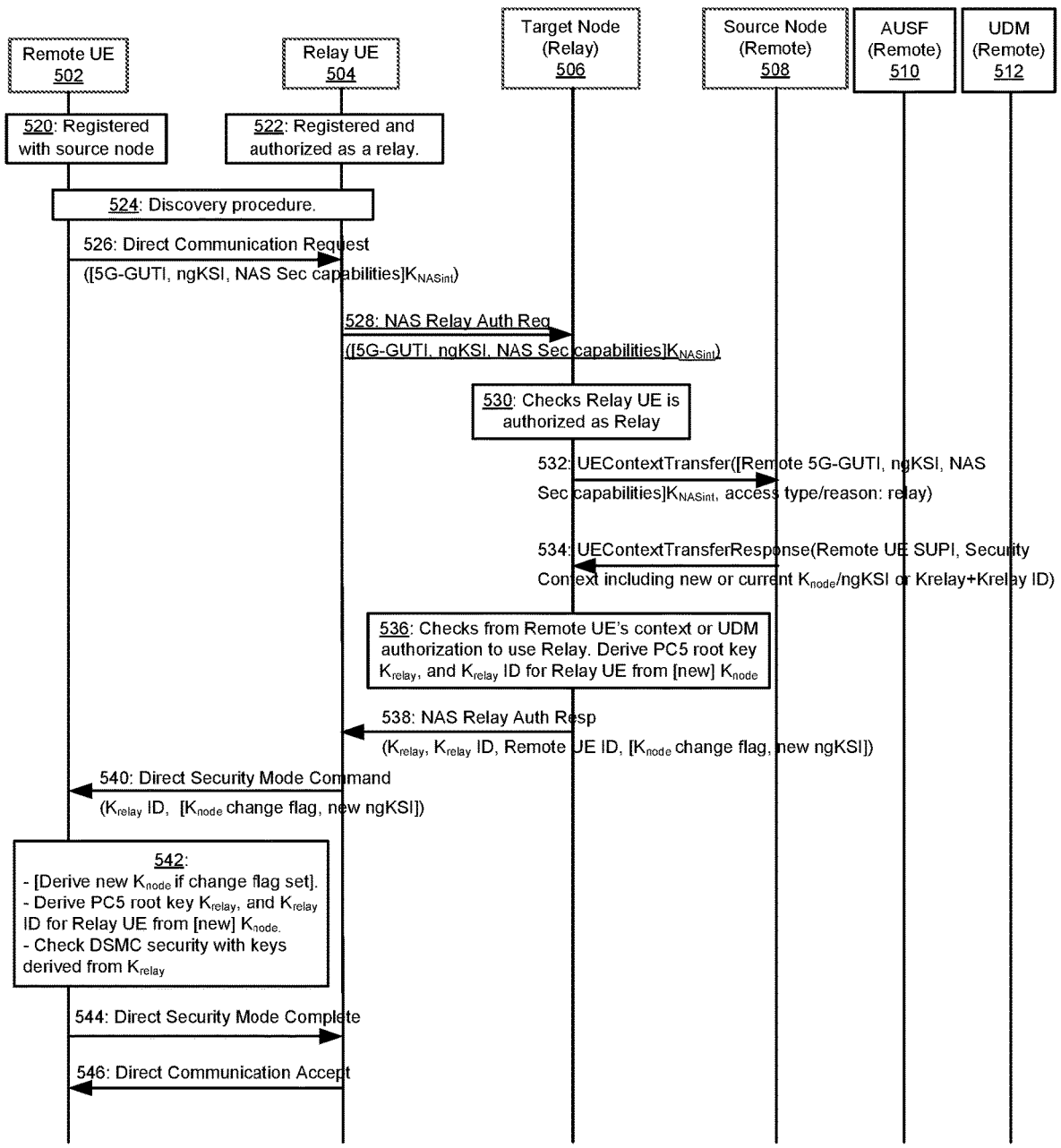
FIG. 5 is a diagram illustrating an example of a control-plane procedure for a PC5 link, in accordance with the present disclosure.

FIG. 5 is a diagram illustrating an example 500 of a control-plane procedure for a PC5 link, in accordance with the present disclosure. Example 500 is associated with technical report (TR) 33.847 and shows a signal diagram for signaling by a remote UE 502 (e.g., a UE 120 depicted in FIGS. 1-2), a relay UE 504 (e.g., a UE 120), a target node 506 (e.g., a network node 130 depicted in FIGS. 1-2, an access and mobility management function (AMF)), a source node 508 (e.g., a network node 130, an AMF), an authentication server function (AUSF) 510 component (e.g., a network node 130) for authenticating UEs, and a unified data management (UDM) 512 component (e.g., a network node 130) for controlling network user data. The nodes may include a control plane function in a core network, such as a 5G core network (5GC), and may interact with a next-generation radio access network (NG-RAN). A control plane function may handle transport of control information between the UE and the core network.

In some scenarios, remote UE 502 may be outside of cell coverage of a base station (e.g., gNB) and select to connect to a UE-to-network (U2N) relay UE 504 via a PC5 interface. In some scenarios, remote UE 502 may be within cell coverage, but at an edge of cell coverage with a signal that is too weak for high broadband usage and thus may select to use relay UE 504 for stronger signals. In some scenarios, because PC5 uses less energy and overhead than a Uu connection to the gNB, remote UE 502 may select to use PC5 to connect to the gNB via relay UE 504 in order to conserve energy and signaling resources.

In using relay UE 504, remote UE 502 may establish some type of message security when trying to access the network. This involves establishing some security for messages between remote UE 502 and relay UE 504. Example 500 shows a possible solution.

As shown by reference number 520, remote UE 502 may register with source node 508, and as shown by reference number 522, relay UE 504 may register as a relay UE. Remote UE 502 may determine that a relay UE is necessary. As shown by reference number 524, remote UE 502 may perform a discovery procedure to find relay UE 504. As shown by reference number 526, remote UE 502 may transmit a direct communication request. The request may include an identity of remote UE 502, indicated by a 5G global unique temporary identifier (5G-GUTI), and a next generation key set indicator (ngKSI) that is associated with keys that may be used for message protection. The request may also include NAS security capabilities, and the request may be protected with a NAS key $Key_{NASint}$. As shown by reference number 528, relay UE 504 may transmit a NAS relay authorization request to target node 506. As shown by reference number 530, target node 506 may check whether relay UE 504 is authorized as a relay. If so, as shown by reference number 532, target node 506 may transmit a UE context transfer message to source node 508. As shown by reference number 534, source node 508 may transmit a UE context transfer response. The target node 506 and the source node 508 may be the same entity.

A UE may have security context information (e.g., valid security context upon registration) at the core network. If remote UE 502 has not registered with the network, remote UE 502 may not have any valid security context. In this case, remote UE 502 may perform primary authentication to establish a security key for PC5 communication. However, remote UE 502 may have to perform primary authentication each time remote UE 502 uses the U2N relay service over the PC5 connection. This incurs extra signaling overhead. Instead of performing primary authentication when remote UE 502 is already registered with the network and has a valid security context, remote UE 502 may use the existing security context for the U2N relay service over the PC5. The remote UE may use the 5G-GUTI as an identity of the UE to identify the security context, which may include locating the network entity in the network that holds the security context of the remote UE and the identity of the security context. Remote UE 502 may protect content using the $K_{NASint}$, which is derived from the existing security context.

As shown by reference number 536, target node 506 may check a security context of remote UE 502 or UDM 512 to determine if remote UE 502 is able to use relay UE 504. Target node 506 may derive a PC5 root key $K_{relay}$ from a key shared between remote UE 502 and a source node 508, referred to as $K_{AMF}$. The shared $K_{AMF}$ may be shared with remote UE 502 during an initial registration, during (idle or connected mode) mobility, and/or during reauthentication. As shown by reference number 538, target node 506 may transmit a NAS relay authorization response that includes $K_{relay}$, an identity (ID) of $K_{relay}$ ($K_{relay}$ ID), and a remote UE ID. The NAS relay authorization response may also include flags indicating whether $K_{AMF}$ changed or if there is a new ngKSI. As shown by reference number 540, relay UE 504 may take the $K_{relay}$ and transmit a direct security mode command that includes the $K_{relay}$ ID and any change flags. As shown by reference number 542, remote UE 502 may derive a new $K_{AMF}$, derive $K_{relay}$ from $K_{relay}$ ID, and/or check integrity protection of Direct Security Mode Command (DSMC) with keys derived from $K_{relay}$. As shown by reference number 544, remote UE 502 may transmit a direct security mode complete message. As shown by reference number 546, relay UE 504 may transmit a direct communication accept message.

However, there are several issues with this procedure. First, there is no key replay protection. For example, there is nothing to limit an amount of times a relay key is used. Second, the security context is transferred from the source node to the target node, and this transfer involves more signaling procedures, such as NAS security mode command (SMC) procedures and 5G-GUTI reallocation. For example, if the 5G-GUTI is used to locate the remote UE security context information, and if security context information is relocated from the source node to the target node, the 5G-GUTI also has to be reallocated by the target node, and the target node has to indicate the new 5G-GUTI to remote UE 502 via relay UE 504 so that the security context information of remote UE 502 is identified by Target node. This extra signaling overhead consumes time, processing resources, and signaling resources. Third, during derivation of the key for the U2N relay service or relay session, there is no key reuse attack prevention. That is, relay UE 504 may continue to have access to remote UE 502 communications after remote UE 502 is no longer selecting to use relay UE 504.

As indicated above, FIG. 5 is provided as an example. Other examples may differ from what is described with regard to FIG. 5.

Figure 6:
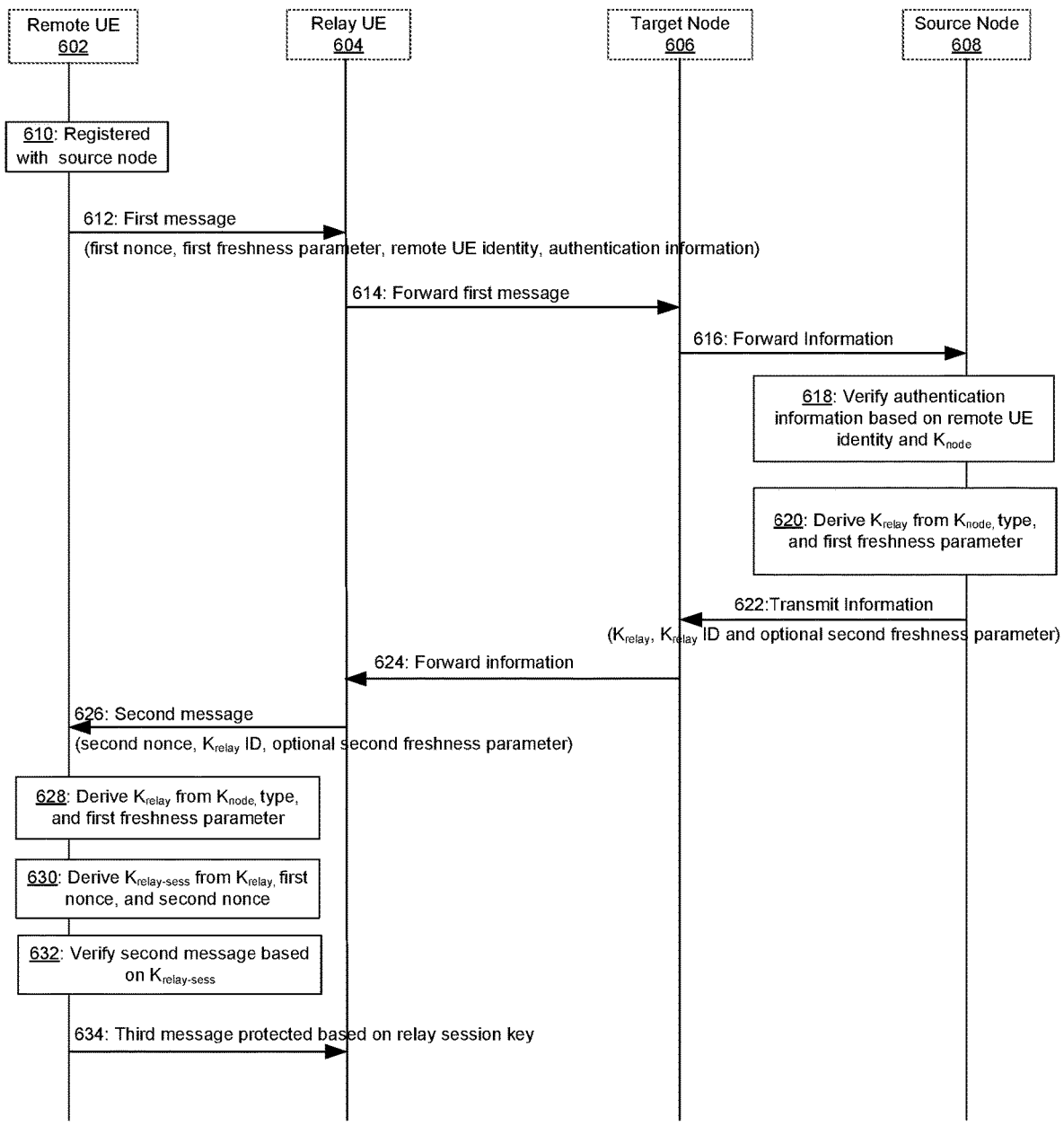
FIG. 6 is a diagram illustrating an example of setting up PC5 link security using a non-access stratum (NAS) security context, in accordance with the present disclosure.

FIG. 6 is a diagram illustrating an example 600 of setting up PC5 link security using a NAS security context, in accordance with the present disclosure. Example 600 shows a signal diagram for signaling by a remote UE 602 (e.g., a UE 120 depicted in FIGS. 1-2), a relay UE 604 (e.g., a UE 120), a target node 606 (e.g., a network node 130 depicted in FIGS. 1-2) and a source node 608 (e.g., a network node 130).

According to various aspects described herein, rather than transferring the security context from source node 608 to target node 606, source node 608 may derive a key (e.g., $K_{relay}$) with information to secure a relay session key $K_{relay-sess}$ for protecting communications between remote UE 602 and relay UE 604. In some aspects, remote UE 602 and source node 608 may use freshness parameters, such as a random number or a count of NAS procedures (e.g., downlink NAS count, uplink NAS count) as part of verification to prevent message replay attacks. The freshness parameters may also be used for $K_{relay}$ and $K_{relay-sess}$ derivation to prevent key reuse attacks. A nonce may be a number (e.g., random number, pseudo-random number, timestamp) that is used to protect private communications by preventing replay attacks. Remote UE 602 may have a first nonce and relay UE 604 may have a second nonce, and the first nonce and the second nonce may be used as freshness parameters to derive $K_{relay-sess}$. As a result, communications by remote UE 602 and relay UE 604 may be secure, while conserving time, processing resources, and signaling resources by avoiding the overhead of additional NAS procedures.

Again, to maintain message security on the PC5 between remote UE 602 and relay UE 604, remote UE 602 and relay UE 604 may establish and share a key between them, $K_{relay-sess}$. As shown by reference number 610, remote UE 602 may have registered with the 5G core network and thus have a security context at the 5G core network. An issue is how to use this security context to establish the $K_{relay-sess}$. To derive the $K_{relay-sess}$, the existing security context at the source node for remote UE 602 may be leveraged by using an node key $K_{node}$ shared between remote UE 602 and source node 608. That is, the $K_{relay-sess}$ for the PC5 interface between remote UE 602 and relay UE 604 is to be derived based at least in part on the $K_{node}$ that is normally established between remote UE 602 and source node 608 as part of setting up the security context during an initial registration, mobility event, or reauthentication for remote UE 602. In this way, the security context is used for the PC5 interface without requiring the usual high-overhead NAS procedures that would normally take place between remote UE 602 and source node 608.

In some aspects, as shown by reference number 612, remote UE 602 may provide information to the network (e.g., source node 608) that is used to derive the $K_{relay-sess}$ that is shared between the remote UE and the relay UE. The $K_{relay-sess}$ may be derived based at least in part on a $K_{relay}$ that is used to provide message security between remote UE 602 and relay UE 604. Source node 608 may derive the $K_{relay}$ based at least in part on not only the $K_{node}$, but also a key access type and a freshness parameter. The freshness parameter may be a random number, an uplink NAS count, a downlink NAS count, or any combination thereof. The freshness parameter may help to keep the $K_{relay}$ fresh so as to prevent the $K_{relay}$ from unauthorized reuse by relay UE 604 after remote UE 602 is no longer using relay UE 604. In sum, the $K_{relay}$ and the $K_{relay-sess}$ may help to maintain message security between remote UE 602 and relay UE 604.

In some aspects, rather than transmitting a NAS message to source node 608 for security context verification, which is not done over a PC5 connection, remote UE 602 may transmit authentication information in a NAS container. The NAS container may include information elements for passing information, such as the authentication information, through to source node 608. The authentication information may include an ngKSI, an uplink NAS count, a key access type, and/or a NAS message authentication code (NAS-MAC). As shown by reference number, remote UE 602 may transmit a first message that includes the authentication information, an identity of remote UE 602 (e.g., 5G-GUTI), and a first freshness parameter (e.g., random number, uplink NAS count, downlink NAS count). Remote UE 602 may transmit a first nonce, which may serve as the freshness parameter. Relay UE 604 may keep track of the first nonce and forward on the other information. Remote UE 602 may contribute the first nonce to derivation of the $K_{relay\text{-}sess}$ and relay UE 604 may contribute a second nonce to the $K_{relay\text{-}sess}$. In this way, both remote UE 602 and relay UE 604 are able to contribute to the randomness of the $K_{relay\text{-}sess}$.

As shown by reference number 614, relay UE 604 forwards the first message to target node 606. As shown by reference number 616, target node 606 forwards information from the first message to source node 608. This may include the identity of remote UE 602 and the authentication information. This may also include the freshness parameter. The identity of remote UE 602, the authentication information, and/or the freshness parameter may be transmitted from target node 606 to source node 608 as (relay) key request information. In some aspects, target node 606 may select the source node based at least in part on a global unique node ID. As shown by reference number 618, source node 608 may locate the security context information for remote UE 602 based at least in part on the identity of remote UE 602 (e.g., 5G-GUTI) and verify the authentication information that is received. The authentication information may be received as information elements of a NAS container, which has a NAS container ID. The NAS-MAC in the authentication information or other parameters in the NAS container ID may be used to verify that the authentication information.

As shown by reference number 620, source node 608 may derive the $K_{relay}$ from the $K_{node}$ and a freshness parameter from remote UE 602. The freshness parameter may be what helps $K_{relay}$ to be more secure when it comes to derivation of the $K_{relay\text{-}sess}$ from the $K_{relay}$. Source node 608 may also use other authentication information or NAS container information, such as a key access type, to derive the $K_{relay}$.

As shown by reference number 622, source node 608 may transmit the $K_{relay}$ and a $K_{relay}$ ID. Source node 608 may also transmit a second freshness parameter, such as another random number or a downlink NAS count, if source node 608 receives a freshness parameter that is not an uplink NAS count. To reduce signaling overhead, source node 608 may transmit eight least significant bits of the downlink NAS count. As shown by reference number 624, target node 606 may forward information to relay UE 604.

Relay UE 604 may receive the $K_{relay}$, the $K_{relay}$ ID, the identity of remote UE 602, and an optional second freshness parameter from source node 608. Relay 604 may keep the $K_{relay}$, and forward on the $K_{relay}$ ID and the optional second freshness parameter. Relay UE 604 may derive the $K_{relay\text{-}sess}$ based at least in part on the first nonce, the second nonce, the first freshness parameter, and optionally the second freshness parameter. If relay UE 604 receives a message from remote UE 602 with the $K_{relay\text{-}sess}$, relay UE 604 may have confidence that the message is from the true remote UE 602, because the $K_{relay\text{-}sess}$ is derived, in part, with the first nonce from remote UE 602. The $K_{relay}$, as derived with the freshness parameter(s), helps to prevent key reuse attacks and replay attacks.

As shown by reference number 626, relay UE 604 transmit a second message to remote UE 602 that includes the second nonce of relay UE 604, the $K_{relay}$ ID, and the optional second freshness parameter from source node 608. As shown by reference number 628, remote UE 602 may derive the $K_{relay}$, using the $K_{relay}$ ID, from the $K_{node}$, a key access type, and the freshness parameter of remote UE 602. As shown by reference number 630, remote UE 602 may then derive $K_{relay\text{-}sess}$ from $K_{relay}$, the first nonce and the second nonce. As shown by reference number 632, remote UE 602 may verify that the second message is from relay UE 604 based at least in part on the $K_{relay\text{-}sess}$. As shown by reference number 634, remote UE 602 may then transmit a third message with data or uplink control information to the network, where the third message is protected (e.g., encrypted, integrity protected) based at least in part on the $K_{relay\text{-}sess}$. Using the $K_{relay\text{-}sess}$, relay UE 604 may verify the third message. Remote UE may now use the $K_{relay\text{-}sess}$ to protect messages (e.g., data) that are being transmitted towards the network via relay UE 604. By providing security for a PC5 link using a security context of remote UE 602, without transferring the security context, remote UE 602 and relay UE 604 may better secure messages between them.

As indicated above, FIG. 6 is provided as an example. Other examples may differ from what is described with regard to FIG. 6.

Figure 7:
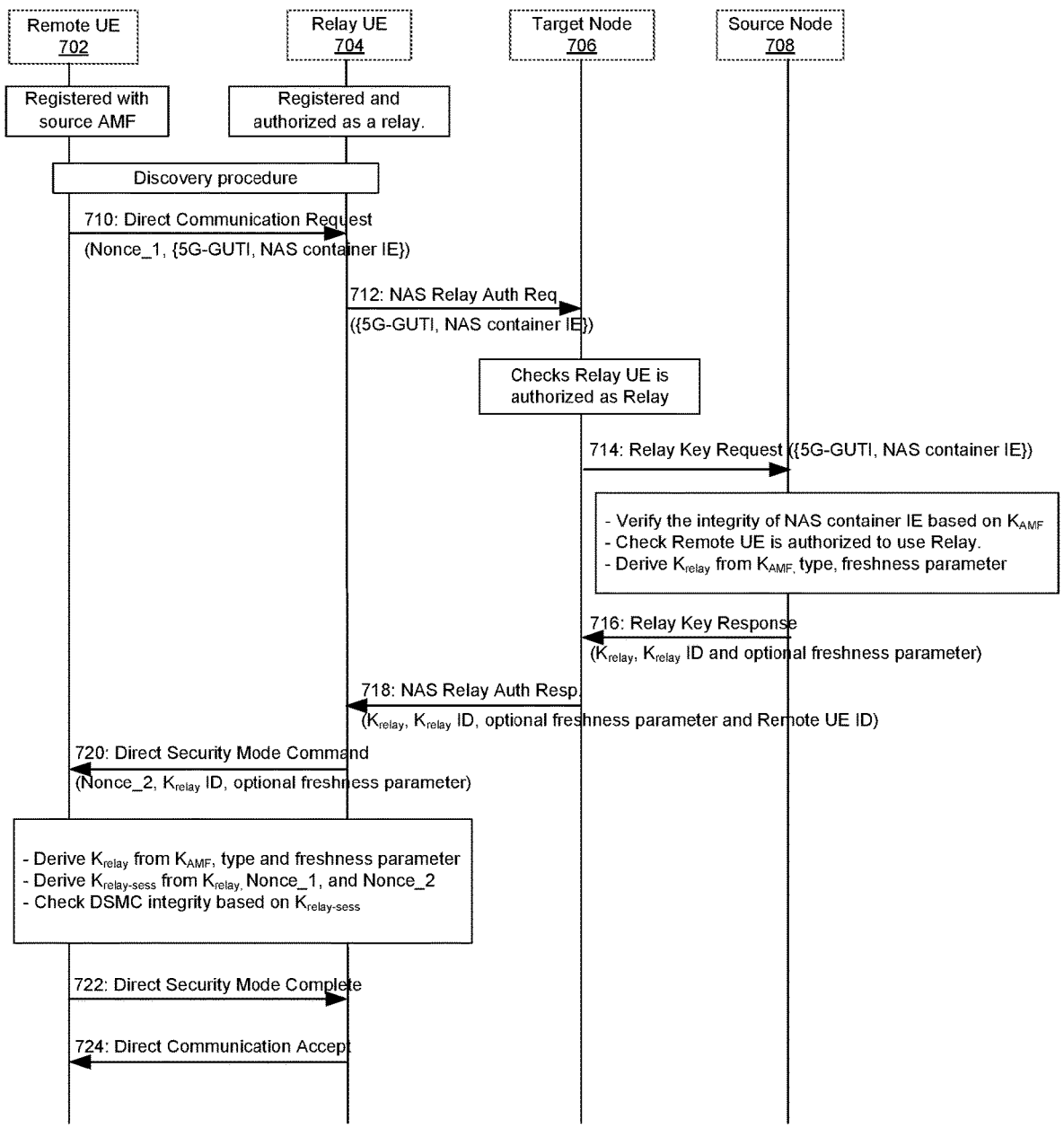
FIG. 7 is a diagram illustrating an example of other details for setting up PC5 link security using a NAS security context, in accordance with the present disclosure.

FIG. 7 is a diagram illustrating an example 700 of other details for setting up PC5 link security using a NAS security context, in accordance with the present disclosure. Example 700 shows a signal diagram for signaling by a remote UE 702 (e.g., a UE 120 depicted in FIGS. 1-2, remote UE 602 depicted in FIG. 6), a relay UE 604 (e.g., a UE 120, remote UE 604 depicted in FIG. 6), a target node 606 (e.g., a network node 130 depicted in FIGS. 1-2) and a source node 608 (e.g., a network node 130, source node 608 depicted in FIG. 6).

The procedure shown in example 600 may be performed with specific types of messages, as shown in example 700. As shown by reference number 710, the first message may be a direct communication request. The authentication information and other information may be included in a NAS container. The first nonce may be a freshness parameter. As shown by reference number 712, the message from relay UE 704 to target node 706 may be a NAS relay authorization request. As shown by reference number 714, the information from target node 706 to source node 708 may be included in a relay key request.

As shown by reference number 716, the information from source node 708 may be included in a relay key response to target node 706. As shown by reference number 718, target node 706 may forward information to relay UE 704 in a NAS relay authorization response. As shown by reference number 720, relay UE 704 may transmit a second message as a direct security mode command. As shown by reference number 722, remote UE 702 may transmit a direct security mode complete message to relay UE 704, and as shown by reference number 724, relay UE 704 may transit a direct communication accept message to remote 702. The direct messages may be part of a key negotiation procedure.

As indicated above, FIG. 7 is provided as an example. Other examples may differ from what is described with regard to FIG. 7.

Figure 8:
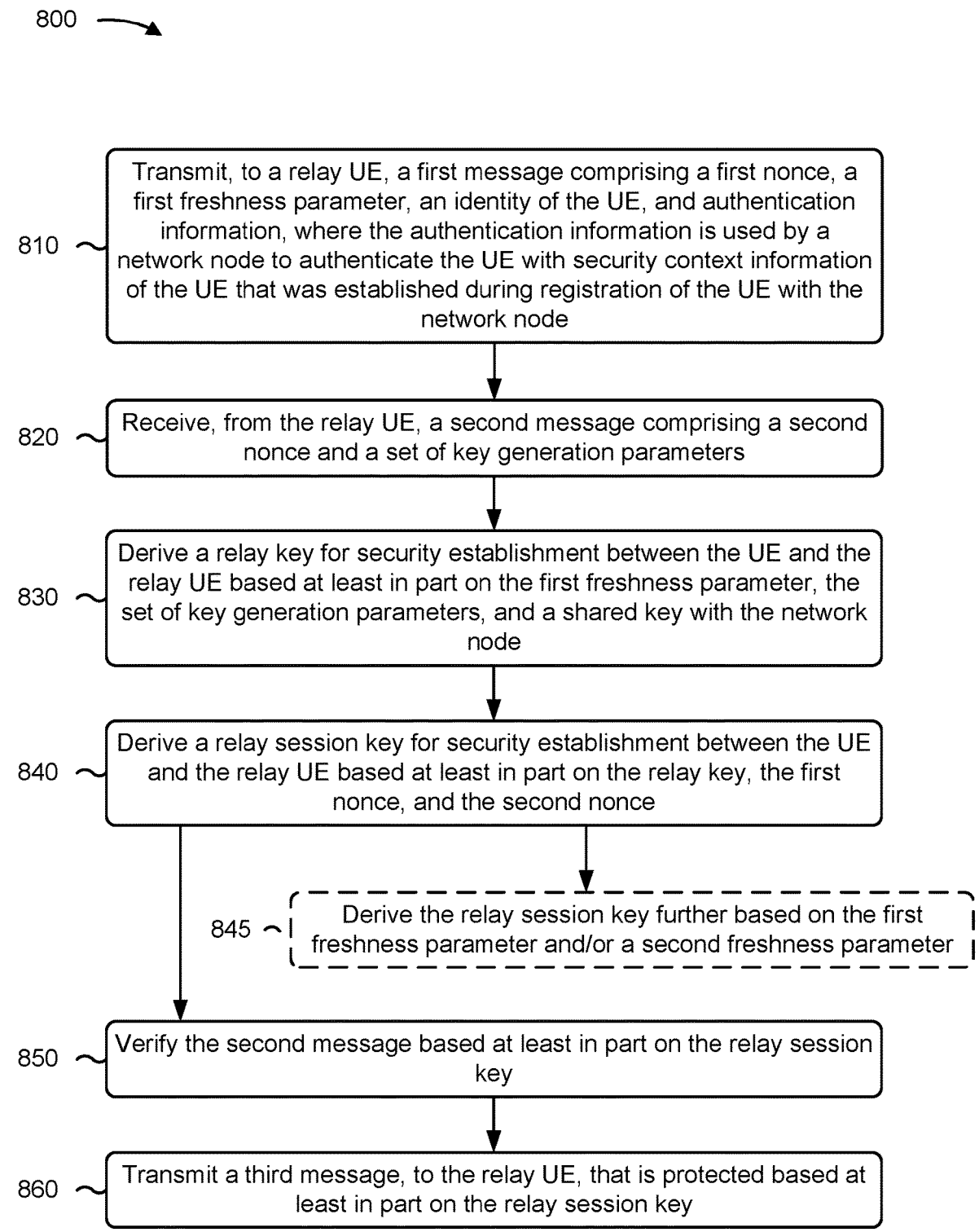
FIG. 8 is a diagram illustrating an example process performed, for example, by a UE, in accordance with the present disclosure.

FIG. 8 is a diagram illustrating an example process 800 performed, for example, by a UE, in accordance with the present disclosure. Example process 800 is an example where the UE (e.g., a UE 120 depicted in FIGS. 1-2, remote UE 602 depicted in FIG. 6, remote UE 702 depicted in FIG.

7) performs operations associated with setting up PC5 link security using a NAS security context.

As shown in FIG. 8, in some aspects, process 800 may include transmitting, to a relay UE, a first message comprising a first nonce, a first freshness parameter, an identity of the UE, and authentication information, where the authentication information is used by a network node (e.g., source node) to authenticate the UE with security context information of the UE that was established during registration of the UE with the network node (block 810). For example, the UE (e.g., using transmission component 1004 depicted in FIG. 10) may transmit, to a relay UE, a first message comprising a first nonce, a first freshness parameter, an identity of the UE, and authentication information, where the authentication information is used by a network node to authenticate the UE with security context information of the UE that was established during registration of the UE with the network node, as described above.

As further shown in FIG. 8, in some aspects, process 800 may include receiving, from the relay UE, a second message comprising a second nonce and a set of key generation parameters (block 820). For example, the UE (e.g., using reception component 1002 depicted in FIG. 10) may receive, from the relay UE, a second message comprising a second nonce and a set of key generation parameters, as described above.

As further shown in FIG. 8, in some aspects, process 800 may include deriving a relay key for security establishment between the UE and the relay UE based at least in part on the first freshness parameter, the set of key generation parameters, and a shared key with the network node (block 830). For example, the UE (e.g., using security component 1008 depicted in FIG. 10) may derive a relay key for security establishment between the UE and the relay UE based at least in part on the first freshness parameter, the set of key generation parameters, and a shared key with the network node, as described above.

As further shown in FIG. 8, in some aspects, process 800 may include deriving a relay session key for security establishment between the UE and the relay UE based at least in part on the relay key, the first nonce, and the second nonce (block 840). For example, the UE (e.g., using security component 1008 depicted in FIG. 10) may derive a relay session key for security establishment between the UE and the relay UE based at least in part on the relay key, the first nonce, and the second nonce, as described above.

As further shown in FIG. 8, in some aspects, process 800 may include verifying the second message based at least in part on the relay session key (block 850). For example, the UE (e.g., using security component 1008 depicted in FIG. 10) may verify the second message based at least in part on the relay session key, as described above.

As further shown in FIG. 8, in some aspects, process 800 may include transmitting a third message, to the relay UE, that is protected based at least in part on the relay session key (block 860). For example, the UE (e.g., using transmission component 1004 depicted in FIG. 10) may transmit a third message, to the relay UE, that is protected based at least in part on the relay session key, as described above.

Process 800 may include additional aspects, such as any single aspect or any combination of aspects described below and/or in connection with one or more other processes described elsewhere herein.

In a first aspect, the set of key generation parameters comprises a relay key identifier, a second freshness parameter, or a combination thereof.

In a second aspect, alone or in combination with the first aspect, the set of key generation parameters is generated by the network node.

In a third aspect, alone or in combination with one or more of the first and second aspects, the second message is encrypted, integrity protected, or both.

In a fourth aspect, alone or in combination with one or more of the first through third aspects, the first nonce is the first freshness parameter.

In a fifth aspect, alone or in combination with one or more of the first through fourth aspects, the first freshness parameter comprises an uplink NAS count or a random number.

In a sixth aspect, alone or in combination with one or more of the first through fifth aspects, the identity of the UE is indicated by a 5G-GUTI.

In a seventh aspect, alone or in combination with one or more of the first through sixth aspects, the authentication information is included as information elements of a NAS container.

In an eighth aspect, alone or in combination with one or more of the first through seventh aspects, the authentication information comprises one or more of a next generation key set identifier, uplink NAS count, key access type, or NAS message authentication code.

In a ninth aspect, alone or in combination with one or more of the first through eighth aspects, as shown by block 845, deriving the relay session key comprises deriving the relay session key further based at least in part on one or more of the first freshness parameter or a second freshness parameter from the network node.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
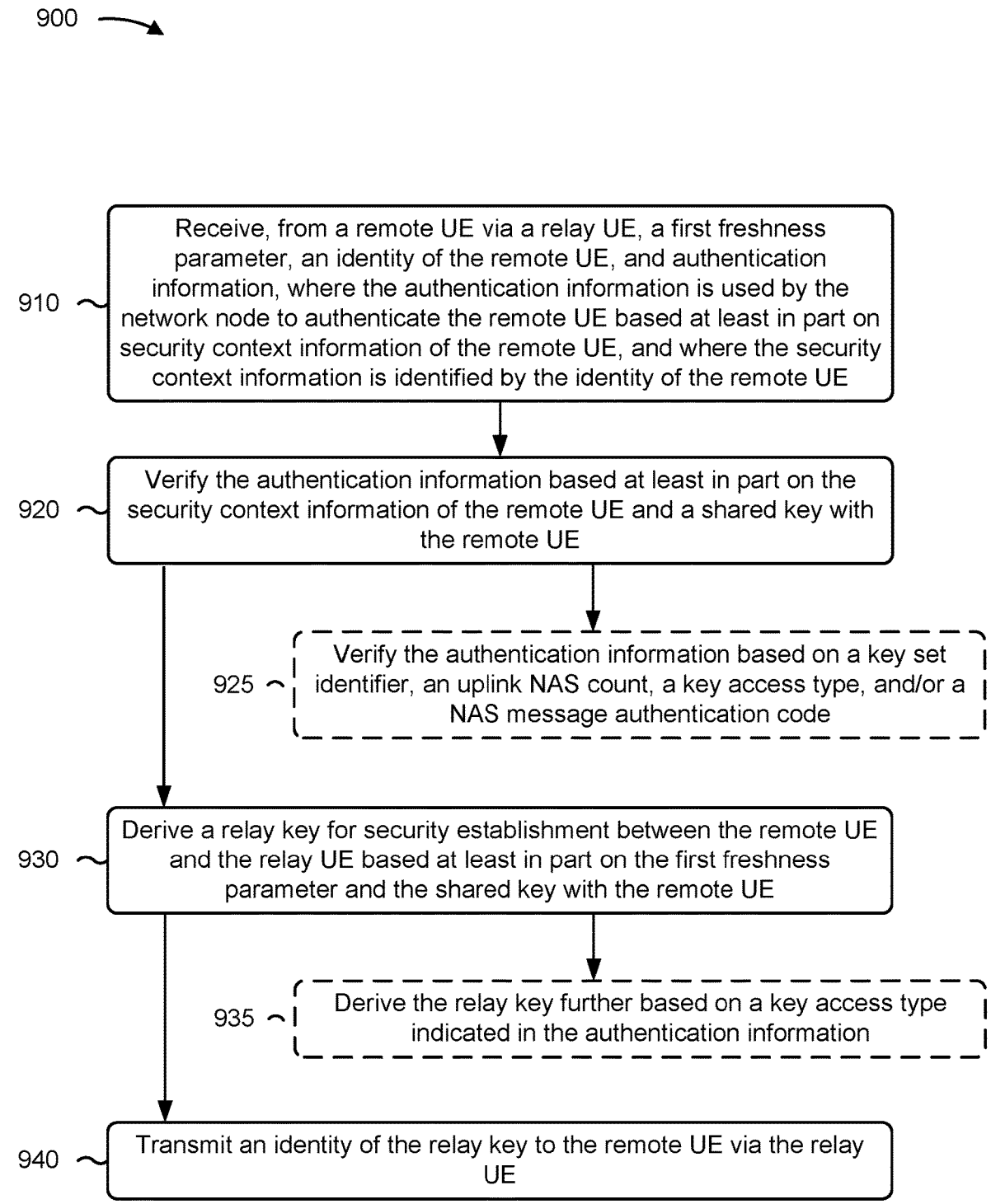
FIG. 9 is a diagram illustrating an example process performed, for example, by a network node, in accordance with the present disclosure.

FIG. 9 is a diagram illustrating an example process 900 performed, for example, by a network node, in accordance with the present disclosure. Example process 900 is an example where the network node (e.g., a network node 130 depicted in FIGS. 1-2, source node 608 depicted in FIG. 6, source node 708 depicted in FIG. 7) performs operations associated with setting up PC5 link security using a NAS security context.

As shown in FIG. 9, in some aspects, process 900 may include receiving, from a remote UE via a relay UE, a first freshness parameter, an identity of the remote UE, and authentication information, where the authentication information is used by the network node to authenticate the remote UE based at least in part on security context information of the remote UE (block 910). For example, the network node (e.g., using reception component 1102 depicted in FIG. 11) may receive, from a remote UE via a relay UE, a first freshness parameter, an identity of the remote UE, and authentication information, where the authentication information is used by the network node to authenticate the remote UE based at least in part on security context information of the remote UE, as described above. In some aspects, the security context information is identified by the identity of the remote UE. In some aspects, receiving the first freshness parameter, the identity of the remote UE, and the authentication information may include receiving the first freshness parameter, the identity of the remote UE, and the authentication information from as (relay) key request information from another network node (e.g., target node). The target node may have received the first freshness parameter, the identity of the remote UE, and the authentication information from the relay UE.

As further shown in FIG. 9, in some aspects, process 900 may include verifying the authentication information based at least in part on the security context information of the remote UE and a shared key with the remote UE (block 920). For example, the network node (e.g., using security component 1108 depicted in FIG. 11) may verify the authentication information based at least in part on the security context information of the remote UE and a shared key with the remote UE, as described above.

As further shown in FIG. 9, in some aspects, process 900 may include deriving a relay key for security establishment between the remote UE and the network node based at least in part on the first freshness parameter and the shared key with the remote UE (block 930). For example, the network node (e.g., using security component 1108 depicted in FIG. 11) may derive a relay key for security establishment between the remote UE and the relay UE based at least in part on the first freshness parameter and the shared key with the remote UE, as described above.

As further shown in FIG. 9, in some aspects, process 900 may include transmitting an identity of the relay key to the remote UE via the relay UE (block 940). For example, the network node (e.g., using transmission component 1104 depicted in FIG. 11) may transmit an identity of the relay key to the remote UE via the relay UE, as described above.

Process 900 may include additional aspects, such as any single aspect or any combination of aspects described below and/or in connection with one or more other processes described elsewhere herein.

In a first aspect, as shown by block 925, deriving the relay key includes deriving the relay key further based at least in part on a key access type indicated in the authentication information from the remote UE.

In a second aspect, alone or in combination with the first aspect, receiving the authentication information includes receiving the authentication information as information elements of a NAS container.

In a third aspect, alone or in combination with one or more of the first and second aspects, as shown by block 935, verifying the authentication information includes verifying one or more of a next generation key set identifier, an uplink NAS count, a key access type, or a NAS-MAC with the security context information of the remote UE based at least in part on the identity of the remote UE.

In a fourth aspect, alone or in combination with one or more of the first through third aspects, the identity of the remote UE is indicated by a 5G-GUTI.

In a fifth aspect, alone or in combination with one or more of the first through fourth aspects, process 900 includes transmitting a second freshness parameter based at least in part on whether the first freshness parameter is an uplink NAS count.

In a sixth aspect, alone or in combination with one or more of the first through fifth aspects, the second freshness parameter is the uplink NAS count, a downlink NAS count, a random number, or a combination thereof.

In a seventh aspect, alone or in combination with one or more of the first through sixth aspects, process 900 includes transmitting the relay key to the relay UE.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

Figure 10:
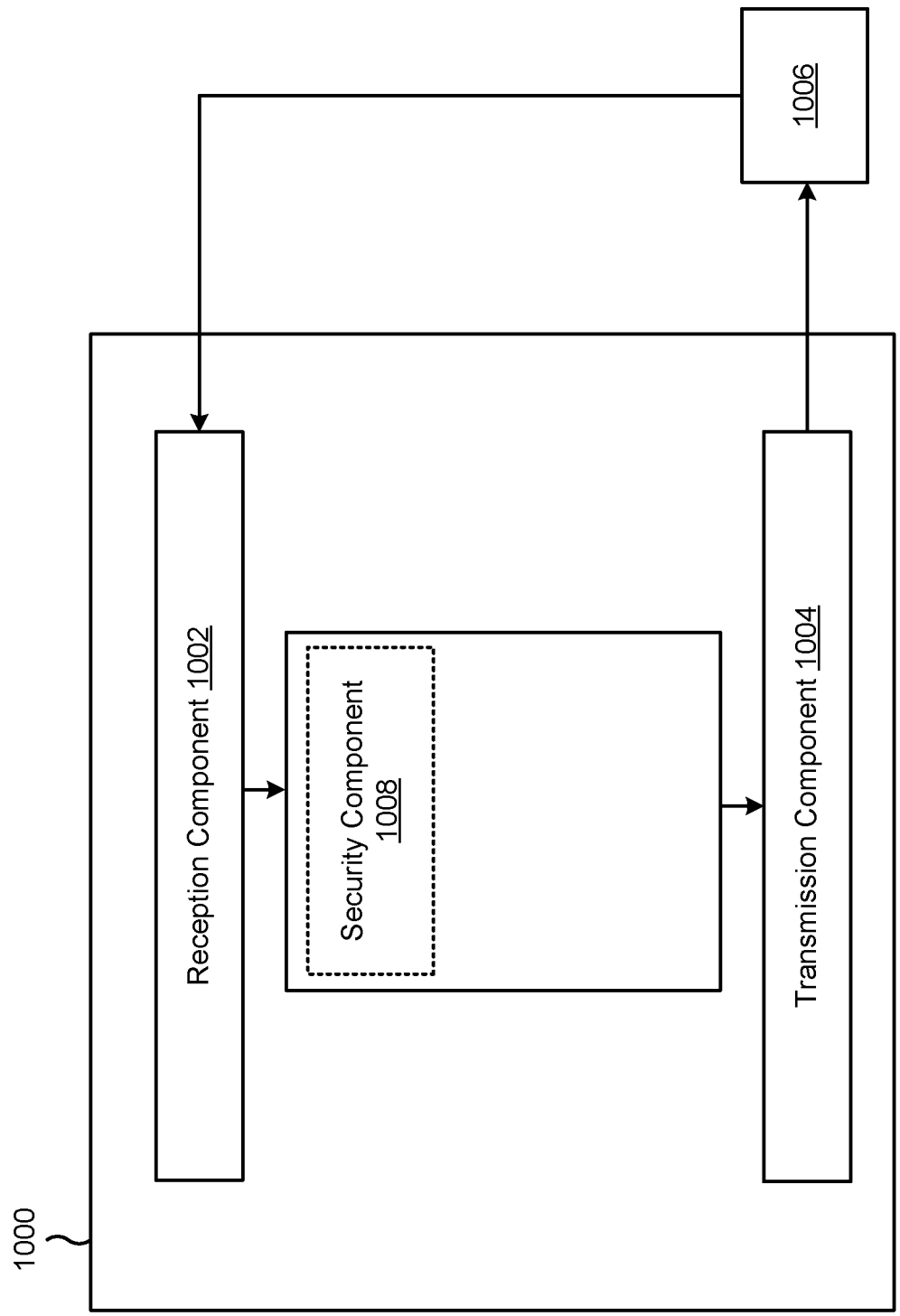
FIGS. 10-11 are block diagrams of example apparatuses for wireless communication, in accordance with the present disclosure.

FIG. 10 is a block diagram of an example apparatus 1000 for wireless communication. The apparatus 1000 may be a UE, or a UE may include the apparatus 1000. In some aspects, the apparatus 1000 includes a reception component 1002 and a transmission component 1004, which may be in communication with one another (for example, via one or more buses and/or one or more other components). As shown, the apparatus 1000 may communicate with another apparatus 1006 (such as a UE, a base station, core network node, or another wireless communication device) using the reception component 1002 and the transmission component 1004. As further shown, the apparatus 1000 may include a security component 1008, among other examples.

In some aspects, the apparatus 1000 may be configured to perform one or more operations described herein in connection with FIGS. 1-7. Additionally, or alternatively, the apparatus 1000 may be configured to perform one or more processes described herein, such as process 800 of FIG. 8. In some aspects, the apparatus 1000 and/or one or more components shown in FIG. 10 may include one or more components of the UE described above in connection with FIG. 2. Additionally, or alternatively, one or more components shown in FIG. 10 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1002 may receive communications, such as reference signals, control information, data communications, or a combination thereof, from the apparatus 1006. The reception component 1002 may provide received communications to one or more other components of the apparatus 1000. In some aspects, the reception component 1002 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1006. In some aspects, the reception component 1002 may include one or more antennas, a demodulator, a MIMO detector, a receive processor, a controller/processor, a memory, or a combination thereof, of the UE described above in connection with FIG. 2.

The transmission component 1004 may transmit communications, such as reference signals, control information, data communications, or a combination thereof, to the apparatus 1006. In some aspects, one or more other components of the apparatus 1006 may generate communications and may provide the generated communications to the transmission component 1004 for transmission to the apparatus 1006. In some aspects, the transmission component 1004 may perform signal processing on the generated communications (such as filtering, amplification, modulation, digital-to-analog conversion, multiplexing, interleaving, mapping, or encoding, among other examples), and may transmit the processed signals to the apparatus 1006. In some aspects, the transmission component 1004 may include one or more antennas, a modulator, a transmit MIMO processor, a transmit processor, a controller/processor, a memory, or a combination thereof, of the UE described above in connection with FIG. 2. In some aspects, the transmission component 1004 may be co-located with the reception component 1002 in a transceiver.

The transmission component 1004 may transmit, to a relay UE, a first message comprising a first nonce, a first freshness parameter, an identity of the UE, and authentication information, where the authentication information is used by a network node to authenticate the UE with security context information of the UE that was established during registration of the UE with the network node. The reception component 1002 may receive, from the relay UE, a second message comprising a second nonce and a set of key generation parameters. The security component 1008 may derive a relay key for security establishment between the UE and the relay UE based at least in part on the first freshness parameter, the set of key generation parameters, and a shared key with the network node. The security component 1008 may derive a relay session key for security establishment between the UE and the relay UE based at least in part on the relay key, the first nonce, and the second nonce. The security component 1008 may verify the second message based at least in part on the relay session key. The transmission component 1004 may transmit a third message, to the relay UE, that is protected based at least in part on the relay session key.

The number and arrangement of components shown in FIG. 10 are provided as an example. In practice, there may be additional components, fewer components, different components, or differently arranged components than those shown in FIG. 10. Furthermore, two or more components shown in FIG. 10 may be implemented within a single component, or a single component shown in FIG. 10 may be implemented as multiple, distributed components. Additionally, or alternatively, a set of (one or more) components shown in FIG. 10 may perform one or more functions described as being performed by another set of components shown in FIG. 10.

Figure 11:
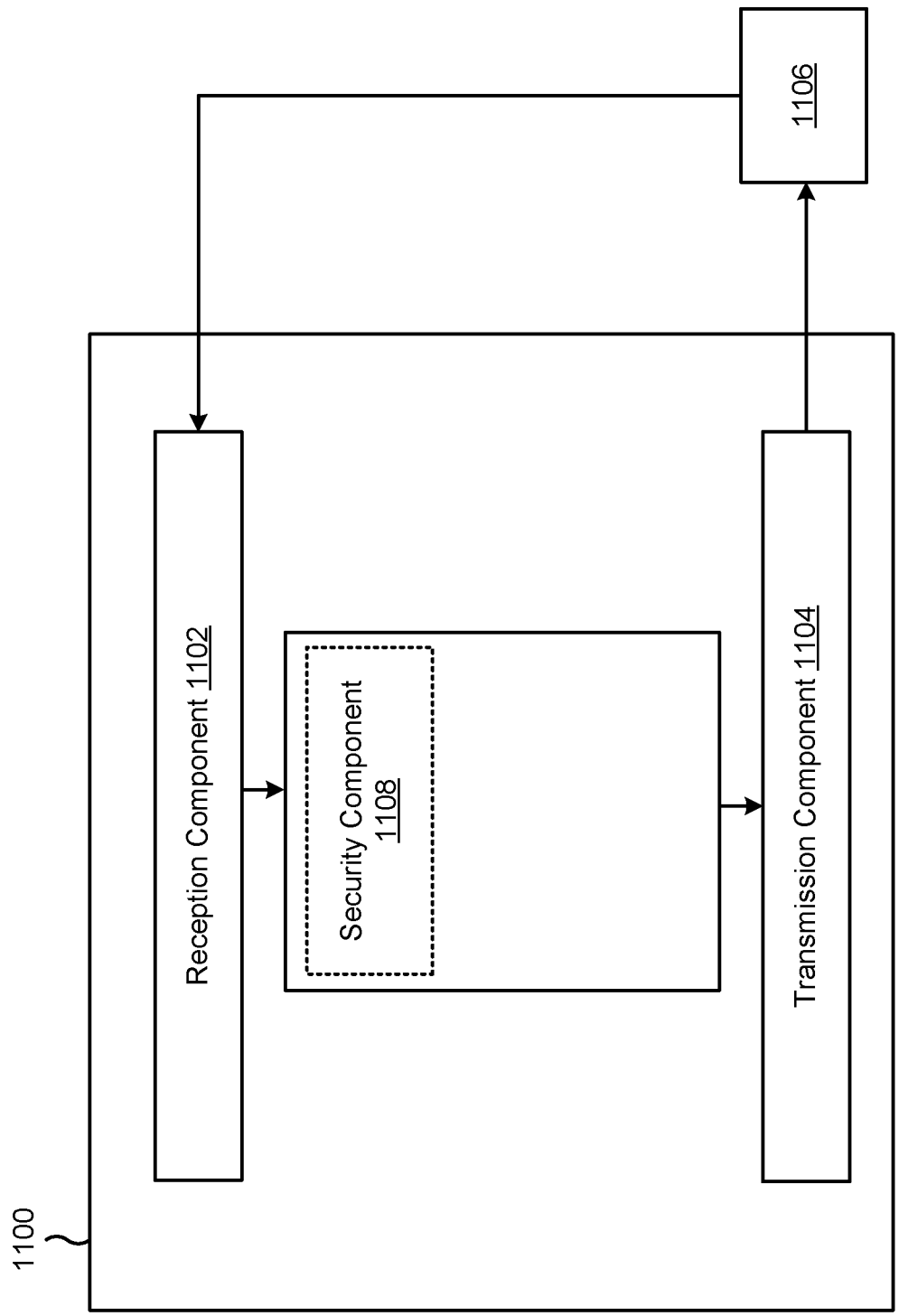

FIG. 11 is a block diagram of an example apparatus 1100 for wireless communication. The apparatus 1100 may be a network node, or a network node may include the apparatus 1100. In some aspects, the apparatus 1100 includes a reception component 1102 and a transmission component 1104, which may be in communication with one another (for example, via one or more buses and/or one or more other components). As shown, the apparatus 1100 may communicate with another apparatus 1106 (such as a UE, a base station, a core network node, or another wireless communication device) using the reception component 1102 and the transmission component 1104. As further shown, the apparatus 1100 may include a security component 1108, among other examples.

In some aspects, the apparatus 1100 may be configured to perform one or more operations described herein in connection with FIGS. 1-7. Additionally, or alternatively, the apparatus 1100 may be configured to perform one or more processes described herein, such as process 900 of FIG. 9. In some aspects, the apparatus 1100 and/or one or more components shown in FIG. 11 may include one or more components of the network node described above in connection with FIG. 2. Additionally, or alternatively, one or more components shown in FIG. 11 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1102 may receive communications, such as reference signals, control information, data communications, or a combination thereof, from the apparatus 1106. The reception component 1102 may provide received communications to one or more other components of the apparatus 1100. In some aspects, the reception component 1102 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1106. In some aspects, the reception component 1102 may include one or more antennas, a demodulator, a MIMO detector, a receive processor, a controller/processor, a memory, or a combination thereof, of the network node 130 described above in connection with FIG. 2.

The transmission component 1104 may transmit communications, such as reference signals, control information, data communications, or a combination thereof, to the apparatus 1106. In some aspects, one or more other components of the apparatus 1106 may generate communications and may provide the generated communications to the transmission component 1104 for transmission to the apparatus 1106. In some aspects, the transmission component 1104 may perform signal processing on the generated communications (such as filtering, amplification, modulation, digital-to-analog conversion, multiplexing, interleaving, mapping, or encoding, among other examples), and may transmit the processed signals to the apparatus 1106. In some aspects, the transmission component 1104 may include one or more antennas, a modulator, a transmit MIMO processor, a transmit processor, a controller/processor, a memory, or a combination thereof, of the network node described above in connection with FIG. 2. In some aspects, the transmission component 1104 may be co-located with the reception component 1102 in a transceiver.

The reception component 1102 may receive, from a remote UE via a relay UE, a first freshness parameter, an identity of the remote UE, and authentication information, where the authentication information is used by the network node to authenticate the remote UE based at least in part on security context information of the remote UE, and where the security context information is identified by the identity of the remote UE. The security component 1108 may verify the authentication information based at least in part on the security context information of the remote UE and a shared key with the remote UE. The security component 1108 may derive a relay key for security establishment between the remote UE and the relay UE based at least in part on the first freshness parameter and the shared key with the remote UE. The transmission component 1104 may transmit an identity of the relay key to the remote UE via the relay UE. The reception component 1102 may receive a message, from the remote UE via the relay UE, that is protected based at least in part on the relay key.

The transmission component 1104 may transmit a second freshness parameter based at least in part on whether the first freshness parameter is an uplink NAS count. The transmission component 1104 may transmit the relay key to the relay UE.

The number and arrangement of components shown in FIG. 11 are provided as an example. In practice, there may be additional components, fewer components, different components, or differently arranged components than those shown in FIG. 11. Furthermore, two or more components shown in FIG. 11 may be implemented within a single component, or a single component shown in FIG. 11 may be implemented as multiple, distributed components. Additionally, or alternatively, a set of (one or more) components shown in FIG. 11 may perform one or more functions described as being performed by another set of components shown in FIG. 11.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a processor is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

The following provides an overview of some Aspects of the present disclosure:

Aspect 1: A method of wireless communication performed by a user equipment (UE), comprising: transmitting, to a relay UE, a first message comprising a first nonce, a first freshness parameter, an identity of the UE, and authentication information, wherein the authentication information is used by a network node to authenticate the UE with security context information of the UE that was established during registration of the UE with the network node; receiving, from the relay UE, a second message comprising a second nonce and a set of key generation parameters; deriving a relay key for security establishment between the UE and the relay UE based at least in part on the first freshness parameter, the set of key generation parameters, and a shared key with the network node; deriving a relay session key for security establishment between the UE and the relay UE based at least in part on the relay key, the first nonce, and the second nonce; verifying the second message based at least in part on the relay session key; and transmitting a third message, to the relay UE, that is protected based at least in part on the relay session key.

Aspect 2: The method of Aspect 1, wherein the set of key generation parameters comprises a relay key identifier, a second freshness parameter, or a combination thereof.

Aspect 3: The method of Aspect 1 or 2, wherein the set of key generation parameters is generated by the network node.

Aspect 4: The method of any of Aspects 1-3, wherein the second message is encrypted, integrity protected, or both.

Aspect 5: The method of any of Aspects 1-4, wherein the first nonce is the first freshness parameter.

Aspect 6: The method of any of Aspects 1-4, wherein the first freshness parameter comprises an uplink non-access stratum count or a random number.

Aspect 7: The method of any of Aspects 1-6, wherein the identity of the UE is indicated by a 5G global unique temporary identifier.

Aspect 8: The method of any of Aspects 1-7, wherein the authentication information is included as information elements of a non-access stratum container.

Aspect 9: The method of any of Aspects 1-8, wherein the authentication information comprises one or more of a next generation key set identifier, uplink non-access stratum (NAS) count, key access type, or NAS message authentication code.

Aspect 10: The method of any of Aspects 1-9, wherein deriving the relay session key comprises deriving the relay session key further based at least in part on one or more of the first freshness parameter or a second freshness parameter from the network node.

Aspect 11: A method of wireless communication performed by a network node, comprising: receiving, from a remote user equipment (UE) via a relay UE, a first freshness parameter, an identity of the remote UE, and authentication information, wherein the authentication information is used by the network node to authenticate the remote UE based at least in part on security context information of the remote UE, and wherein the security context information is identified by the identity of the remote UE; verifying the authentication information based at least in part on the security context information of the remote UE and a shared key with the remote UE; deriving a relay key for security establishment between the remote UE and the relay UE based at least in part on the first freshness parameter and the shared key with the remote UE; transmitting an identity of the relay key to the remote UE via the relay UE; and receiving a message, from the remote UE via the relay UE, that is protected based at least in part on the relay key.

Aspect 12: The method of Aspect 11, wherein deriving the relay key includes deriving the relay key further based at least in part on a key access type indicated in the authentication information from the remote UE.

Aspect 13: The method of Aspect 11 or 12, wherein receiving the authentication information includes receiving the authentication information as information elements of a non-access stratum container.

Aspect 14: The method of any of Aspects 11-13, wherein verifying the authentication information includes verifying one or more of a next generation key set identifier, an uplink non-access stratum (NAS) count, a key access type, or a NAS message authentication code with the security context information of the remote UE based at least in part on the identity of the remote UE.

Aspect 15: The method of any of Aspects 11-14, wherein the identity of the remote UE is indicated by a 5G global unique temporary identifier.

Aspect 16: The method of any of Aspects 11-15, further comprising transmitting a second freshness parameter based at least in part on whether the first freshness parameter is an uplink non-access stratum (NAS) count.

Aspect 17: The method of Aspect 16, wherein the second freshness parameter is the uplink NAS count, a downlink NAS count, a random number, or a combination thereof.

Aspect 18: The method of any of Aspects 11-17, further comprising transmitting the relay key to the relay UE.

Aspect 19: An apparatus for wireless communication at a device, comprising a processor; memory coupled with the processor; and instructions stored in the memory and executable by the processor to cause the apparatus to perform the method of one or more Aspects of Aspects 1-18.

Aspect 20: A device for wireless communication, comprising a memory and one or more processors coupled to the memory, the memory and the one or more processors configured to perform the method of one or more Aspects of Aspects 1-18.

Aspect 21: An apparatus for wireless communication, comprising at least one means for performing the method of one or more Aspects of Aspects 1-18.

Aspect 22: A non-transitory computer-readable medium storing code for wireless communication, the code comprising instructions executable by a processor to perform the method of one or more Aspects of Aspects 1-18.

Aspect 23: A non-transitory computer-readable medium storing a set of instructions for wireless communication, the set of instructions comprising one or more instructions that, when executed by one or more processors of a device, cause the device to perform the method of one or more Aspects of Aspects 1-18.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A user equipment (UE) for wireless communication, comprising:
   a memory; and
   one or more processors, coupled to the memory, configured to:
   transmit, to a relay UE, a first message comprising a first nonce, a first freshness parameter, an identity of the UE, and authentication information, wherein the authentication information is used by a network node to authenticate the UE with security context information of the UE that was established during registration of the UE with the network node;
   receive, from the relay UE, a second message comprising a second nonce and a set of key generation parameters;
   derive a relay key for security establishment between the UE and the relay UE based at least in part on the first freshness parameter, the set of key generation parameters, and a shared key with the network node;
   derive a relay session key for security establishment between the UE and the relay UE based at least in part on the relay key, the first nonce, and the second nonce;
   verify the second message based at least in part on the relay session key; and
   transmit a third message, to the relay UE, that is protected based at least in part on the relay session key.

2. The UE of claim 1, wherein the network node is a source access and mobility management function (AMF).

3. The UE of claim 1, wherein the set of key generation parameters comprises a relay key identifier, a second freshness parameter, or a combination thereof.

4. The UE of claim 1, wherein the set of key generation parameters is generated by the network node.

5. The UE of claim 1, wherein the second message is encrypted, integrity protected, or both.

6. The UE of claim 1, wherein the first nonce is the first freshness parameter.

7. The UE of claim 1, wherein the first freshness parameter comprises an uplink non-access stratum count or a random number.

8. The UE of claim 1, wherein the identity of the UE is indicated by a 5G global unique temporary identifier.

9. The UE of claim 1, wherein the authentication information is included as information elements of a non-access stratum container.

10. The UE of claim 1, wherein the authentication information comprises one or more of a next generation key set identifier, uplink non-access stratum (NAS) count, key access type, or NAS message authentication code.

11. The UE of claim 1, wherein the one or more processors, when deriving the relay session key, are configured to derive the relay session key further based at least in part on one or more of the first freshness parameter or a second freshness parameter from the network node.

12. A network node for wireless communication, comprising:
   a memory; and
   one or more processors, coupled to the memory, configured to:
   receive, from a remote user equipment (UE) via a relay UE, a first freshness parameter, an identity of the remote UE, and authentication information, wherein the authentication information is used by the network node to authenticate the remote UE based at least in part on security context information of the remote UE, and wherein the security context information is identified by the identity of the remote UE;

verify the authentication information based at least in part on the security context information of the remote UE and a shared key with the remote UE;

derive a relay key for security establishment between the remote UE and the relay UE based at least in part on the first freshness parameter and the shared key with the remote UE; and transmit an identity of the relay key to the remote UE via the relay UE.

13. The network node of claim 12, wherein the one or more processors, when deriving the relay key, are configured to derive the relay key further based at least in part on a key access type indicated in the authentication information from the remote UE.

14. The network node of claim 12, wherein the one or more processors, when receiving the authentication information, are configured to receive the authentication information as information elements of a non-access stratum container.

15. The network node of claim 12, wherein the one or more processors, when verifying the authentication information, are configured to verify one or more of a next generation key set identifier, an uplink non-access stratum (NAS) count, a key access type, or a NAS message authentication code with the security context information of the remote UE based at least in part on the identity of the remote UE.

16. The network node of claim 12, wherein the identity of the remote UE is indicated by a 5G global unique temporary identifier.

17. The network node of claim 12, wherein the one or more processors are further configured to transmit a second freshness parameter based at least in part on whether the first freshness parameter is an uplink non-access stratum (NAS) count.

18. The network node of claim 17, wherein the second freshness parameter is the uplink NAS count, a downlink NAS count, a random number, or a combination thereof.

19. The network node of claim 12, wherein the one or more processors are further configured to transmit the relay key to the relay UE.

20. A method of wireless communication performed by a user equipment (UE), comprising:

transmitting, to a relay UE, a first message comprising a first nonce, a first freshness parameter, an identity of the UE, and authentication information, wherein the authentication information is used by a network node to authenticate the UE with security context information of the UE that was established during registration of the UE with the network node;

receiving, from the relay UE, a second message comprising a second nonce and a set of key generation parameters;

deriving a relay key for security establishment between the UE and the relay UE based at least in part on the first freshness parameter, the set of key generation parameters, and a shared key with the network node;

deriving a relay session key for security establishment between the UE and the relay UE based at least in part on the relay key, the first nonce, and the second nonce;

verifying the second message based at least in part on the relay session key; and transmitting a third message, to the relay UE, that is protected based at least in part on the relay session key.

21. The method of claim 20, wherein the set of key generation parameters comprises a relay key identifier, a second freshness parameter, or a combination thereof.

22. The method of claim 20, wherein the second message is encrypted, integrity protected, or both.

23. The method of claim 20, wherein the first nonce is the first freshness parameter.

24. The method of claim 20, wherein the first freshness parameter comprises an uplink non-access stratum count or a random number.

25. The method of claim 20, wherein deriving the relay session key comprises deriving the relay session key further based at least in part on one or more of the first freshness parameter or a second freshness parameter from the network node.

26. A method of wireless communication performed by a network node, comprising:

receiving, from a remote user equipment (UE) via a relay UE, a first freshness parameter, an identity of the remote UE, and authentication information, wherein the authentication information is used by the network node to authenticate the remote UE based at least in part on security context information of the remote UE, and wherein the security context information is identified by the identity of the remote UE;

verifying the authentication information based at least in part on the security context information of the remote UE and a shared key with the remote UE;

deriving a relay key for security establishment between the remote UE and the relay UE based at least in part on the first freshness parameter and the shared key with the remote UE; and transmitting an identity of the relay key to the remote UE via the relay UE.

27. The method of claim 26, wherein deriving the relay key includes deriving the relay key further based at least in part on a key access type indicated in the authentication information from the remote UE.

28. The method of claim 26, wherein verifying the authentication information includes verifying one or more of a next generation key set identifier, an uplink non-access stratum (NAS) count, a key access type, or a NAS message authentication code with the security context information of the remote UE based at least in part on the identity of the remote UE.

29. The method of claim 26, further comprising transmitting a second freshness parameter based at least in part on whether the first freshness parameter is an uplink non-access stratum (NAS) count, and wherein the second freshness parameter is the uplink NAS count, a downlink NAS count, a random number, or a combination thereof.

30. The method of claim 26, further comprising transmitting the relay key to the relay UE.

* * * * *